(12) United States Patent
Yoshimi

(10) Patent No.: US 8,844,037 B2
(45) Date of Patent: Sep. 23, 2014

(54) INFORMATION PROCESSING APPARATUS AND METHOD, AND PROGRAM

(75) Inventor: Hideo Yoshimi, Tokyo (JP)

(73) Assignee: Sony Corporation, Tokyo (JP)

( * ) Notice: Subject to any disclaimer, the term of this patent is extended or adjusted under 35 U.S.C. 154(b) by 87 days.

(21) Appl. No.: 13/419,846

(22) Filed: Mar. 14, 2012

(65) Prior Publication Data

US 2012/0255005 A1  Oct. 4, 2012

(30) Foreign Application Priority Data

Mar. 28, 2011  (JP) ................. 2011-069925

(51) Int. Cl.
*G06F 21/00* (2013.01)
*G06F 21/55* (2013.01)
*G06F 21/72* (2013.01)

(52) U.S. Cl.
CPC .............. G06F 21/554 (2013.01); G06F 21/72 (2013.01)
USPC ........................................................ 726/23

(58) Field of Classification Search
CPC ................................ G06F 21/554; G06F 21/72
USPC ........................................................ 726/23
See application file for complete search history.

(56) References Cited

U.S. PATENT DOCUMENTS

| | | | | |
|---|---|---|---|---|
| 5,428,687 A * | 6/1995 | Willcocks et al. | ............... | 381/18 |
| 5,852,369 A * | 12/1998 | Katsuma | ............... | 324/678 |
| 5,898,711 A * | 4/1999 | Buer | ............... | 714/800 |
| 6,034,833 A * | 3/2000 | Jung | ............... | 360/67 |
| 6,169,508 B1 * | 1/2001 | Edwards | ............... | 341/150 |
| 6,188,615 B1 * | 2/2001 | Perner et al. | ............... | 365/158 |
| 6,496,554 B1 * | 12/2002 | Ahn | ............... | 375/376 |
| 6,507,913 B1 * | 1/2003 | Shamir | ............... | 726/36 |
| 6,922,696 B1 * | 7/2005 | Lincoln et al. | ............... | 1/1 |
| 6,963,190 B2 * | 11/2005 | Asanuma et al. | ............... | 323/283 |
| 7,080,001 B2 * | 7/2006 | Moriyama et al. | ............... | 713/600 |
| 7,134,042 B2 * | 11/2006 | Shimasaki | ............... | 714/4.1 |
| 7,146,509 B2 * | 12/2006 | Marinet et al. | ............... | 713/194 |
| 7,362,140 B2 * | 4/2008 | Hassoune et al. | ............... | 326/115 |
| 7,417,468 B2 * | 8/2008 | Verbauwhede et al. | ...... | 326/112 |
| 7,498,644 B2 * | 3/2009 | Shapiro et al. | ............... | 257/428 |
| 7,500,270 B2 * | 3/2009 | Vataja | ............... | 726/30 |
| 7,555,787 B2 * | 6/2009 | Clercq | ............... | 726/34 |
| 7,571,492 B2 * | 8/2009 | Hubert | ............... | 726/36 |
| 7,590,880 B1 * | 9/2009 | Hershman | ............... | 713/502 |
| 7,692,449 B2 * | 4/2010 | Verbauwhede et al. | ...... | 326/46 |
| 7,716,502 B2 * | 5/2010 | Muresan et al. | ............... | 713/300 |
| 7,859,421 B2 * | 12/2010 | Berthold et al. | ............... | 340/653 |
| 7,953,389 B2 * | 5/2011 | Coleman et al. | ............... | 455/410 |
| 8,089,255 B2 * | 1/2012 | Chen | ............... | 323/282 |
| 8,165,297 B2 * | 4/2012 | Hoffmann | ............... | 380/256 |
| 8,334,707 B2 * | 12/2012 | Kuenemund | ............... | 326/46 |
| 8,350,574 B2 * | 1/2013 | Nobukata | ............... | 324/537 |
| 8,365,310 B2 * | 1/2013 | Shamir | ............... | 726/36 |
| 8,390,311 B2 * | 3/2013 | Kyue et al. | ............... | 326/8 |
| 8,411,504 B2 * | 4/2013 | Modave et al. | ............... | 365/185.04 |

(Continued)

FOREIGN PATENT DOCUMENTS

JP         10-154976 A       6/1998

*Primary Examiner* — David García Cervetti
(74) *Attorney, Agent, or Firm* — Sony Corporation

(57) ABSTRACT

An information processing apparatus including: an attack detection unit that detects an attack; and a strength adjustment unit that incrementally raises the strength of a security measure every time that an attack is detected by the attack detection unit.

17 Claims, 15 Drawing Sheets

(56) References Cited

U.S. PATENT DOCUMENTS

| | | | |
|---|---|---|---|
| 8,412,931 B2* | 4/2013 | Vedula et al. | 713/161 |
| 2002/0124183 A1* | 9/2002 | Marinet et al. | 713/200 |
| 2002/0199111 A1* | 12/2002 | Clark et al. | 713/194 |
| 2004/0227497 A1* | 11/2004 | Asanuma et al. | 323/283 |
| 2005/0021476 A1* | 1/2005 | Candella et al. | 705/64 |
| 2005/0037733 A1* | 2/2005 | Coleman et al. | 455/411 |
| 2005/0113068 A1* | 5/2005 | Hoffmann | 455/411 |
| 2005/0166263 A1* | 7/2005 | Nanopoulos et al. | 726/7 |
| 2005/0240782 A1* | 10/2005 | Hubert | 713/300 |
| 2006/0156039 A1* | 7/2006 | Deveaud et al. | 713/300 |
| 2007/0044155 A1* | 2/2007 | Pletka et al. | 726/25 |
| 2007/0057698 A1* | 3/2007 | Verbauwhede et al. | 327/52 |
| 2007/0076890 A1* | 4/2007 | Muresan et al. | 380/287 |
| 2007/0180285 A1* | 8/2007 | Dembo | 713/500 |
| 2007/0222475 A1* | 9/2007 | Hassoune et al. | 326/27 |
| 2008/0102797 A1* | 5/2008 | Coleman et al. | 455/411 |
| 2008/0260150 A1* | 10/2008 | De Clercq | 380/255 |
| 2009/0039919 A1* | 2/2009 | Verbauwhede et al. | 326/46 |
| 2009/0172788 A1* | 7/2009 | Vedula et al. | 726/5 |
| 2009/0189702 A1* | 7/2009 | Berthold et al. | 331/46 |
| 2010/0005533 A1* | 1/2010 | Shamir | 726/36 |
| 2010/0070953 A1* | 3/2010 | Velten et al. | 717/140 |
| 2010/0301873 A1* | 12/2010 | Nobukata | 324/537 |
| 2011/0035733 A1* | 2/2011 | Horning et al. | 717/140 |
| 2011/0139879 A1* | 6/2011 | Morin et al. | 235/492 |
| 2011/0154034 A1* | 6/2011 | Bailey, Jr. | 713/168 |
| 2011/0185432 A1* | 7/2011 | Sandoval et al. | 726/25 |
| 2011/0225432 A1* | 9/2011 | Trichina | 713/190 |
| 2012/0151608 A1* | 6/2012 | Morin et al. | 726/36 |
| 2012/0153987 A1* | 6/2012 | Cauli et al. | 326/22 |
| 2012/0200313 A1* | 8/2012 | Kyue et al. | 326/8 |

* cited by examiner

FIG. 9

| TYPE OF SECURITY MEASURE | | SECURITY LEVEL 1 | SECURITY LEVEL 2 | SECURITY LEVEL 3 |
|---|---|---|---|---|
| | RECALCULATION OF IMPORTANT PROCESSES | ONE | TWO | THREE |
| | INSERTION OF TIMING JITTER | 10 % | 20 % | 30 % |
| | DUMMY COMPUTATION | NO | NO | YES |
| | TIME UNTIL STRENGTH OF SECURITY MEASURE IS LOWERED | 10 MINUTES | 30 MINUTES | 60 MINUTES |
| | NUMBER OF SUCCESSFUL REGULATION PROCESSES | ONE | TWO | THREE |

INFORMATION PROCESSING APPARATUS AND METHOD, AND PROGRAM

CROSS-REFERENCE TO RELATED APPLICATION

The present application claims priority from Japanese Patent Application No. JP 2011-069925, filed in the Japanese Patent Office on Mar. 28, 2011, the entire content of which is incorporated herein by reference.

BACKGROUND

The present technology relates to an information processing apparatus and method, and a program, and particularly relates to an information processing apparatus and method, and a program that are able to improve the security level while maintaining processing speed.

In recent years, active attacks on IC (Integrated Circuit) chips that are included in IC cards have been becoming a threat. An active attack refers to a malicious third party artificially and forcibly causing an IC chip to execute actions that are different from ordinary actions in order to obtain confidential information by irradiating a laser beam on the IC card or the like.

As a typical example of such an active attack, there is a DFA (Differential Fault Analysis) attack. A DFA refers to a malicious third party artificially and forcibly causing an IC chip to execute actions that are different from ordinary actions and obtaining confidential information by comparing an abnormal calculation result that is obtained as a result with a normal calculation result by normal actions obtained in advance.

As a technique of the related art of protecting confidential information from active attacks such as such DFAs, there is a technique of detecting actions that are different from ordinary actions (that is, abnormal actions due to an active attack) by recalculating important processes such as encryption calculation (refer to Japanese Unexamined Patent Application Publication No. 10-154976).

SUMMARY

However, in recent years, apparatuses that are able to irradiate powerful laser beams at short cycles have been commercially produced. In order to protect confidential information from active attacks on such apparatuses applying the technique of the related art, it is important to improve the security level by further increasing the number of recalculations, security checks, or the like. On the other hand, an improvement of the security level leads to a decrease in the processing speed of the IC chip. In such a manner, if the technique of the related art is applied, a tradeoff relationship emerges between the security level and the processing speed of the IC chip, and it is extremely difficult to improve the security level while maintaining the processing speed of the IC chip.

It is desirable to improve the security level while maintaining processing speed.

According to an embodiment of the present technology, there is provided an information processing apparatus including: an attack detection unit that detects an attack; and a strength adjustment unit that incrementally raises the strength of a security measure every time that an attack is detected by the attack detection unit.

The strength adjustment unit may incrementally lower the strength of the security measure every time that a predetermined condition is satisfied.

The strength adjustment unit may raise the strength of the security measure using at least one of an increase in the number of recalculations of important processes, an increase in the insertion amount of a timing jitter, an insertion of dummy calculation, an increase in the amount of time taken until returning to a normal mode, and an increase in the number of successful regulating processes.

The predetermined condition may be a condition that a predetermined amount of time has passed since an attack was detected by the attack detection unit.

The predetermined condition may be a condition that the execution of a regulation process has been successful.

A charging and discharging unit that charges a capacitor after the detection of an attack by the attack detection unit, and a charge amount detection unit that compares a charge amount of the capacitor that is being discharged by the charging and discharging unit and a predetermined threshold value may be further included, wherein the predetermined amount of time may be the discharging time of the capacitor until the charge amount reaches the predetermined threshold value.

The strength adjustment unit may make the target for raising the strength of the security measure a function by which an attack has been detected by the attack detection unit.

The strength adjustment unit may make the target for raising the strength of the security measure all functions that constituent elements of the information processing apparatus execute in which the function by which an attack has been detected by the attack detection unit is being executed.

According to another embodiment of the present technology, there are provided an information processing method and a program that correspond to the information processing apparatus according to the embodiment of the present technology described above.

According to the information processing method and the program according to the embodiment of the present technology, attacks are detected and the strength of the security measure is incrementally raised every time than an attack is detected.

As above, according to the embodiments of the present technology, the security level is able to be improved while maintaining processing speed.

BRIEF DESCRIPTION OF THE DRAWINGS

FIG. 9 is a diagram that describes the relationship between the type and the strength of a security measure;

DETAILED DESCRIPTION OF EMBODIMENTS

[Outline of Embodiments of Present Technology]

First, the outline of the embodiments of the present technology will be described in order to facilitate understanding.

An IC card according to the embodiments of the present technology incrementally raises the security level (hereinafter also referred to as the strength of a security measure) every time that an active attack (hereinafter abbreviated to an attack) is detected. For example, an IC card in which the recalculation of encryption calculation is adopted as a security measure increases the number of recalculations by one every time that an attack is detected. Since the strength of the security measure of the IC card then increases at an accelerating rate every time than an attacker attempts an attack on the IC card, the success rate of attacks on the IC card decreases dramatically.

On the other hand, if the strength of a security measure is kept high, there is a concern that the processing speed decreases and usability is harmed. Therefore, in order to maintain usability, the IC card according to the embodiments of the present technology incrementally lowers the strength of security measure when a predetermined condition is satisfied after the detection of an attack. For example, in a case when a predetermined amount of time has passed after a detection of an attack or in a case when the execution of a regulation process has been successful, the IC card lowers the number of recalculations one at a time. Since the processing speed then becomes closer to the original speed every time that a predetermined condition is satisfied, usability is maintained.

In such a manner, with regard to an IC card, by incrementally adjusting the strength of the security measure, the security level is able to be improved while maintaining processing speed.

Four embodiments of the present technology (hereinafter respectively referred to as first to fourth embodiments) will be described below in the following order.

1. First Embodiment (example in which the number of recalculations as a security measure is incrementally adjusted)

2. Second Embodiment (example in which the strength of a plurality of security measures is incrementally adjusted)

3. Third Embodiment (example in which functions in which the strength of a security measure is incrementally adjusted are limited)

4. Fourth Embodiment (example in which locations in which the strength of a security measure is incrementally adjusted are limited)<

<1. First Embodiment>

[Configuration Example of IC Card]

Figure 1:
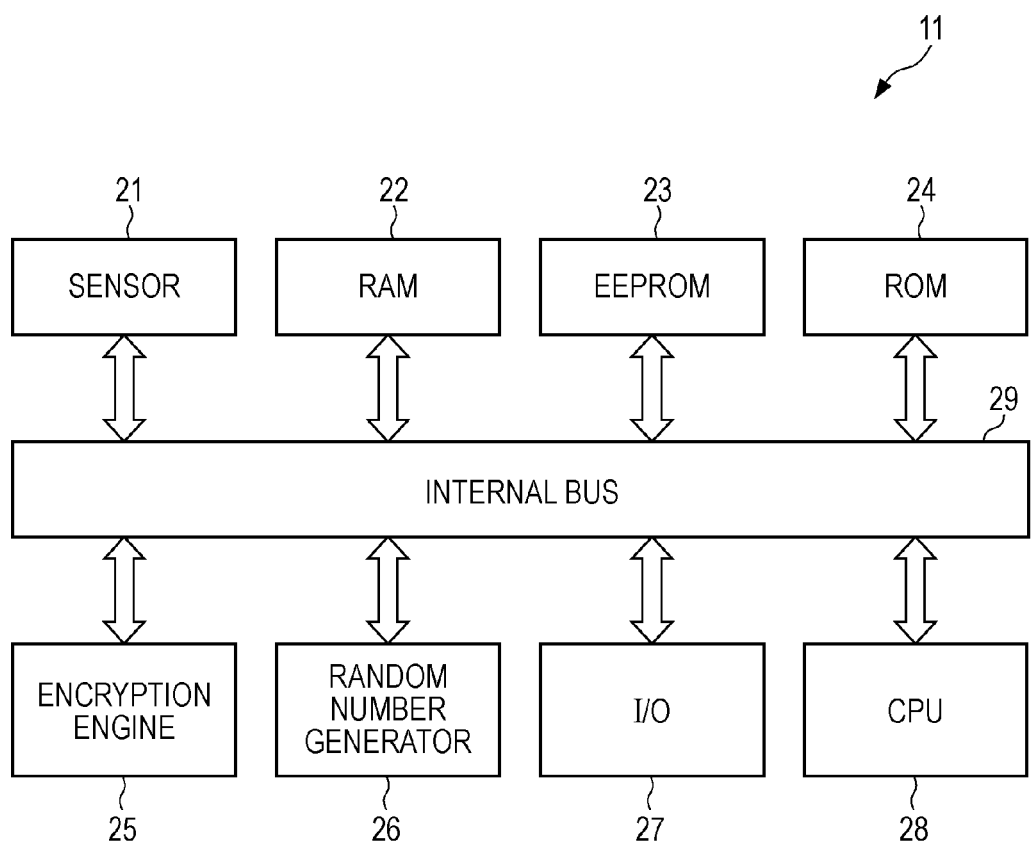
FIG. 1 is a block diagram that illustrates a configuration example of an IC chip.

FIG. 1 is a block diagram that illustrates a configuration example of an IC chip that is included in the IC card.

An IC chip 11 is configured by a sensor 21, a RAM (Random Access Memory) 22, an EEPROM (Electrically Erasable and Programmable Read Only Memory) 23, a ROM (Read Only Memory) 24, an encryption engine 25, a random number generator 26, an I/O (Input/Output) 27, and a CPU (Central Processing Unit) 28 being connected to one another by an internal bus 29.

The sensor 21 detects the voltage supplied to the IC chip 11, the clock frequency, external conditions such as temperature and light, and the like, and monitors whether or not the detection result is within a normal range set in advance.

The RAM 22 stores various data that is used by the CPU 28 to execute various processes as appropriate.

The EEPROM 23 and the ROM 24 store various programs.

The encryption engine 25 encrypts or decrypts various data such as data that is transceived between another apparatus such as a reader-writer and the IC card and data that is stored in the EEPROM 23 using random numbers that the random number generator 26 generates by an AES (Advanced Encryption Standard) method. Further, the encryption engine 25 performs creation of a key, mutual authentication, and the like when encrypting or decrypting.

The random number generator 26 generates random numbers that are used by the encryption engine 25 and supplies the random numbers to the encryption engine 25 via the internal bus 29.

The I/O 27 performs transceiving of data with other apparatuses. For example, the I/O 27 transmits data that is supplied from the CPU 28 via the internal bus 29 to a reader-writer, receives the data from the reader-writer, and supplies the data to the CPU 28 and the like via the internal bus 29 by performing contactless transceiving of data with the reader-writer using electromagnetic waves.

The CPU 28 executes various processes according to a program that is recorded on the EEPROM 23 or the ROM 24. Further, the CPU 28 executes various processes according to a program that is loaded on the RAM 22. Data that is used by the CPU 28 to execute various processes and the like are also stored in the RAM 22 as appropriate.

The IC chip 11 illustrated in FIG. 1 is able to adopt the following three detection techniques, for example, as detection techniques of detecting an attack.

A first detection technique is a technique in which the sensor 21 detects an attack from external conditions or the like. As described above, the sensor 21 detects the voltage supplied to the IC chip 11, the clock frequency, external conditions such as temperature and light, and the like, and monitors whether or not the detection result is within a normal range that is set in advance. Furthermore, in a case when the detection values such as such external conditions indicate abnormal values, the sensor 21 determines that the IC chip 11 has been attacked.

A second detection technique is a technique in which the CPU 28 detects attacks from the calculation results of important processes. The CPU 28 performs recalculations on important processes and verifies whether normal calculation results and the recalculation calculation results match. Furthermore, in a case when the normal calculation results and the recalculation calculation results do not match, the CPU 28 determines that the IC chip 11 has been attacked.

A third detection technique is a technique in which the CPU 28 detects an attack from a returned value of a function. The CPU 28 verified whether the returned value of a function set in advance is normal. Furthermore, in a case when the returned value indicates an abnormal value, the CPU 28 determines that the IC chip 11 has been attacked.

Here, the first to third detection techniques may be used individually or an arbitrary number of arbitrary types of detection techniques may be used in combination. Furthermore, a different detection technique not described here may be used alone or in combination with an arbitrary number of arbitrary types of other detection techniques including the first to third detection techniques. That is, a technique of the IC chip 11 detecting attacks is sufficient if the technique allows the detection of an attack on the IC chip 11, and an arbitrary number of one or more arbitrary types of techniques may be used in combination as appropriate.

In a case when an attack is detected by such techniques, the IC chip 11 increases the difficulty for the attack to succeed by incrementally increasing the count value of the number of recalculations of important processes by one every time that an attack is detected. A case when encryption calculation is adopted as an important process for which the number of recalculations is increased will be described as an example below.

[Example in which Number of Recalculations is Incrementally Increased]

Figure 2:
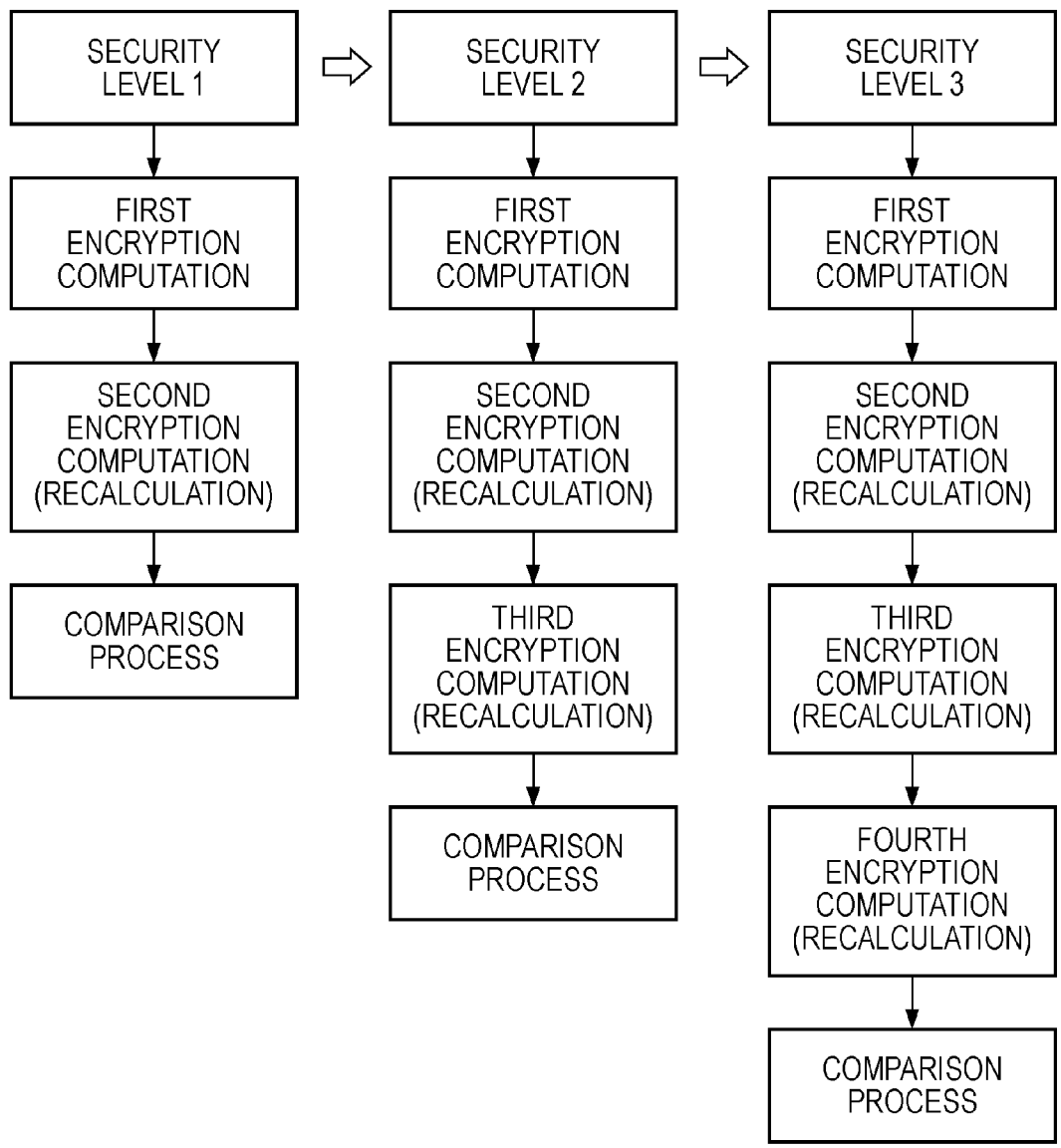
FIG. 2 is a diagram that describes an example in which the number of recalculations is incrementally increased.

FIG. 2 is a diagram that describes an example in which the number of recalculations of the encryption calculation is incrementally increased.

As illustrated in the drawing to the left of FIG. 2, when the security level is 1, that is, when it is normal in which an attack has not been detected, the IC chip 11 executes a first encryption calculation before executing a second encryption calculation that is similar to the first encryption calculation in order to recalculate the first encryption calculation. Therefore, in the case of security level 1, the number of recalculations is 1. The IC chip 11 executes a comparison process of comparing the calculation results of the first and second encryption calculations, and determines that there has not been an attack in a case when the calculation results match and determines that there has been an attack in a case when the calculation results do not match.

In other words, from the viewpoint of the attacker, if both of the first and second encryption calculations are able to be attacked to generate the same errors, since the results of the comparison process would then match, the IC chip 11 is able to be made to determine that there has not been an attack. In such a case, the attacker would obtain confidential information before the IC chip 11 realizes. However, since it is difficult to generate the same two errors consecutively with only one attack, and further, it is extremely rare that confidential information is leaked from only one error result. Therefore, the attacker normally persistently repeats a plurality of attacks even while attacks are detected by the IC chip 11 a number of times.

Therefore, once an attack is detected in the state of security level 1, as illustrated in the drawing in the center of FIG. 2, the IC chip 11 raises the security level to 2 and increases the number of recalculations of the encryption calculation to two. That is, after the IC chip 11 executes the first encryption calculation, the IC chip 11 performs the second encryption calculation and a third encryption calculation as recalculations thereof. Furthermore, the IC chip 11 executes a comparison process of comparing the three calculation results of the first to third encryption calculations, and determines that there has not been an attack in a case when all three calculation results match and determines that there has been an attack in a case when even one combination of the combinations of any two calculation results selected from the three calculation results does not match.

In other words, from the viewpoint of the attacker, if the IC chip 11 is to be made to determine that there has not been an attack, while the number of same errors to be generated consecutively was two with security level 1, with security level 2, such a number increases to three. In such a manner, if the security level changes from 1 to 2, the number of recalculations increases from two to three, and as a result, the difficulty of the attack (that is, probability that obtaining confidential information fails) becomes high.

Furthermore, once an attack is detected in the state of security level 2, as illustrated in the drawing to the right of FIG. 2, the IC chip 11 raises the security level to 3 and increases the number of recalculations of the encryption calculation to three. That is, after the IC chip 11 executes the first encryption calculation, the IC chip 11 performs second to fourth encryption calculations as recalculations thereof. Furthermore, the IC chip 11 executes a comparison process of comparing the four calculation results of the first to fourth encryption calculations, and determines that there has not been an attack in a case when all four calculation results match and determines that there has been an attack in a case when even one combination of the combinations of any two calculation results selected from the four calculation results does not match.

In other words, from the viewpoint of the attacker, if the IC chip 11 is to be made to determine that there has not been an attack, while the number of same errors to be generated consecutively was three with security level 2, with security level 3, such a number increases to four. In such a manner, if the security level changes from 2 to 3, the number of recalculations increases from three to four, and as a result, the difficulty of the attack (that is, probability that obtaining confidential information fails) becomes high.

In such a manner, the security level increases every time than an attack is detected, since the number of recalculations increases by such an amount, as a result, the difficulty of attacks increases and the probability that the attacker is able to obtain confidential information decreases.

Here, while obvious, the amount by which the number of recalculations which is increased every time that security is raised is not limited to one, and an arbitrary amount is able to be adopted.

On the other hand, if the number of recalculations increases, the processing speed of the IC chip 11 decreased by such an amount. Therefore, in a case when a predetermined condition is satisfied, the IC chip 11 suppresses the decrease in its own processing speed by reducing the number of recalculations. Here, as the predetermined condition, one or a combination of the two conditions below is able to be adopted.

As a first condition, a condition that a predetermined amount of time has passed since a detection of an attack is able to be adopted. That is, the number of recalculations is reduced one at a time as the first condition is deemed to be satisfied every time that 30 minutes passes, for example.

As a second condition, a condition that the execution of a regulation process has been successful is able to be adopted. That is, in a case when a regulation process, for example, the processing according to a mutual authentication command in a mutual authentication process has been successful, it is deemed that the condition has been satisfied, and the number of recalculations is reduced by one. Here, a regulation process is not limited to the execution of a mutual authentication command, and for example, the various other processes that the IC chip 11 performs such as a process according to a recalculation number initialization command are able to be executed.

In such a manner, it is possible to suppress the processing speed of the IC chip 11 decreasing by reducing the number of recalculations in a case when predetermined conditions are satisfied such as with the first and second conditions. Here, the predetermined condition is not limited to the first and second predetermined conditions described above.

Of such first and second conditions, details of the first condition will be described below.

With a apparatus to which electric power is constantly supplied, it is easy to clock a predetermined amount of time based on a clock counter that is installed within the apparatus. However, with the IC card of the related art, since electric power is only supplied when the IC card is in proximity to a reader-writer or the like, it was extremely difficult to clock a predetermined amount of time.

Therefore, an IC card on which the IC chip 11 according to the embodiment is installed is configured to be able to adopt the first condition by measuring a predetermined amount of time using the charging and discharging time of a capacitor that is built in.

A charging and discharging circuit that is designed so that the measurement of a predetermined amount of time is possible is installed on the IC card of the embodiment. The measurement of a predetermined amount of time using such a charging and discharging circuit will be described using FIGS. 3A and 3B and 4.

[Measurement of Predetermined Amount of Time]

Figure 3A:
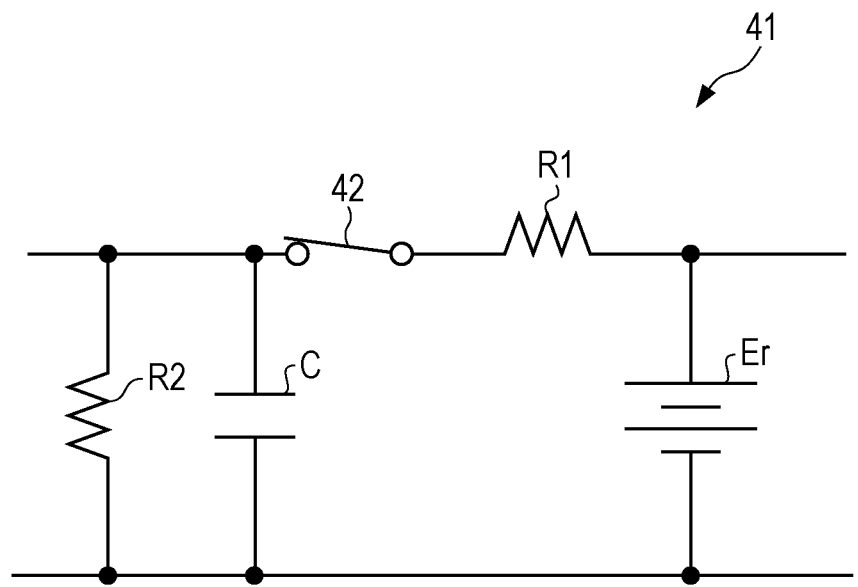
FIGS. 3A and 3B are diagrams that describe the principles of a charging and discharging circuit that is installed on the IC card.
Figure 3B:
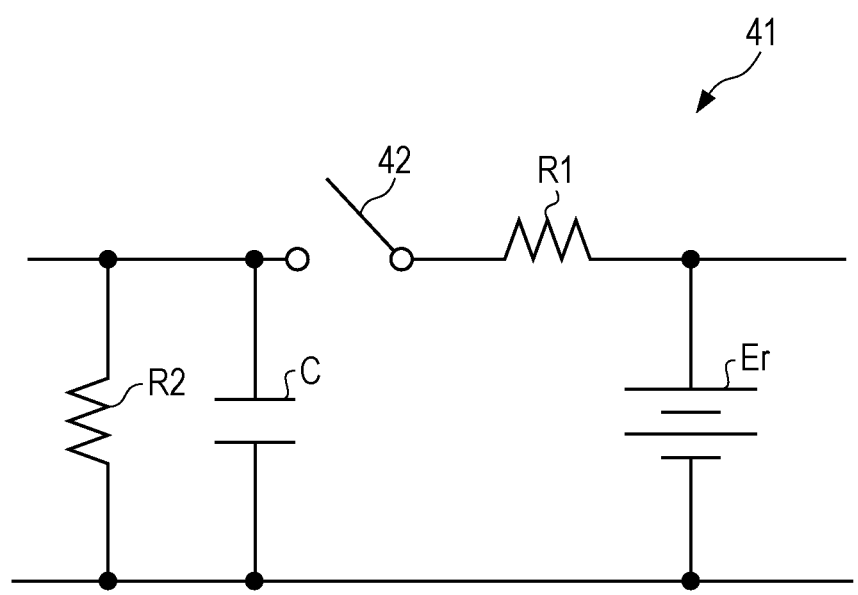

FIGS. 3A and 3B are diagrams that describe the principles of the charging and discharging circuit that is installed on the IC card of the embodiment.

FIG. 3A is an equivalent circuit diagram of a charging and discharging circuit 41 in a case when the capacitor charges by a reader-writer or the like being in proximity.

The charging and discharging circuit 41 is a CR circuit that is configured by a capacitor C and resistances R1 and R2. That is, out of the parallel connection of the capacitor C and the resistance R2, one end is grounded and an input terminal is connected to the other end. When the IC card comes into proximity to a reader-writer or the like, a state occurs in which a power source Er is connected to the input terminal and the input terminal and one end of the resistance R1 are connected, in other words, a state occurs that is equivalent to a state in which a virtual switch 42 that connects the input terminal with an output terminal via the resistance R1 is ON. In such a case, the electric power that is supplied from the reader-writer or the like (electric power that is supplied from the power source Er in the equivalent circuit) is used for charging the capacitor C, and as a result, the charge of a predetermined charge amount Q is accumulated.

FIG. 3B is an equivalent circuit diagram of the charging and discharging circuit 41 in a case when the capacitor is discharged by a reader-writer or the like being moved away.

If the reader-writer or the like is moved away from the IC card, as illustrated in FIG. 3B, a state occurs that is equivalent to a state in which the virtual switch 42 that connects the input terminal with the output terminal via the resistance R1 is OFF. In such a case, the charge of the predetermined charge amount Q that is accumulated in the capacitor C is discharged to the output terminal side.

Figure 4:
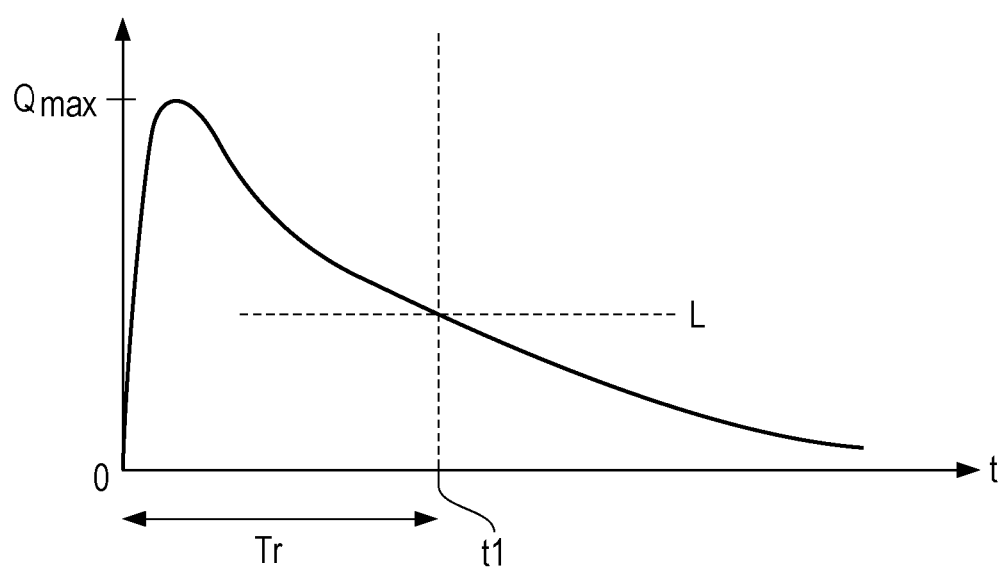
FIG. 4 is a timing chart of the charge amount when a capacitor C that is an equivalent circuit is charging and discharging.

FIG. 4 is a timing chart of the charge amount of the capacitor C of the equivalent circuit of FIG. 3 during charging and discharging.

In FIG. 4, the vertical axis indicates the charge amount of the capacitor C and the horizontal axis indicates time.

The time at which the IC card is brought into proximity to a reader-writer or the like and the virtual switch is switched to an ON state, that is, the time at which charging to the capacitor C is started is the reference time 0.

As illustrated in FIG. 4, once the charging to the capacitor C is started at the reference time 0, the charge amount then immediately rises and reaches a charge amount $Q_{max}$. At such a state, if the IC card is moved away from the reader-writer, discharging is started and the charge amount decreases.

Therefore, in the embodiment, the charging and discharging circuit 41 is set so that a time Tr from the start of discharging (since the charging time is extremely short, if ignored, time 0) to a time t1 at which the charge amount becomes less than a predetermined threshold value L becomes the predetermined amount of time described above, for example, 30 minutes. For example, since the charging and discharging circuit 41 is a CR circuit, the response characteristics of the discharging of the capacitor C are able to be treated as the primary delay, and if the predetermined threshold value L is a charge amount at 63% of the charge amount $Q_{max}$, the amount of time Tr taken until the threshold value is reached is a time constant, the time Tr is able to be ascertained easily by the product of the resistance values of the electrostatic capacitance of the capacitor C and the resistance R2. In other words, the designer is able to easily design the electrostatic capacitance of the capacitor C and the resistance value of the resistance R2 of the charging and discharging circuit 41 so that the time Tr becomes a predetermined amount of time (for example, 30 minutes). Here, such a threshold value L and the predetermined amount of time are only examples.

Since the charging and discharging circuit 41 that is able to measure a predetermined amount of time in such a manner is installed on the IC card of the embodiment, the first condition for reducing the number of recalculations after an attack has ended is able to be adopted. That is, once the predetermined amount of time has been measure since the detection of an attack by the charging and discharging circuit 41, the IC card of the embodiment deems that the first condition has been satisfied and reduces the number of recalculations by one.

[Functional Configuration Example of CPU]

Figure 5:
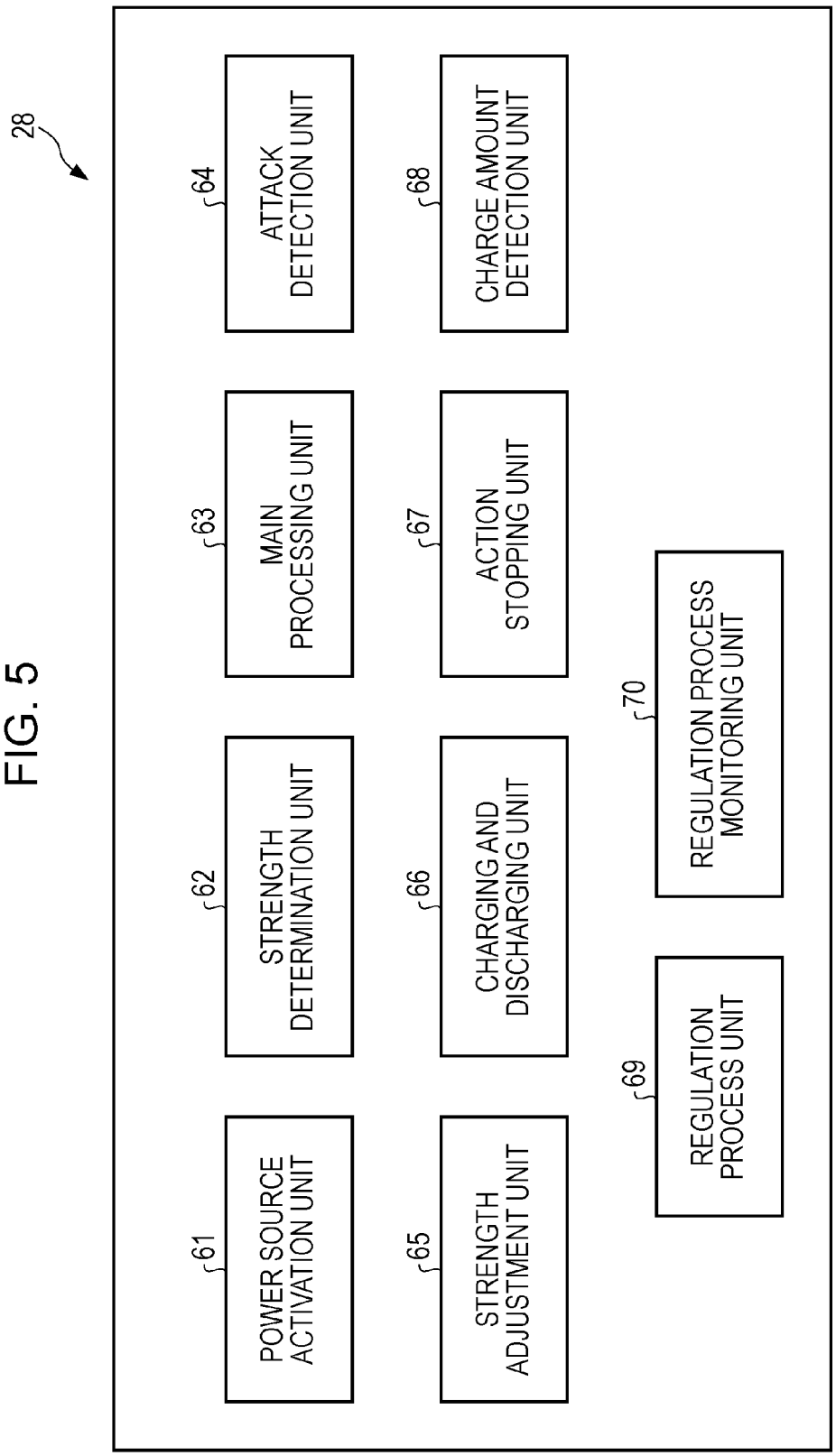
FIG. 5 is a block diagram that illustrates a functional configuration example of a CPU.

FIG. 5 is a diagram that illustrates a functional configuration example for realizing the various functions for incrementally adjusting the strength of security measures out of the functions of the CPU 28 of FIG. 1.

The CPU 28 includes a power source activation unit 61, a strength determination unit 62, a main processing unit 63, an attack detection unit 64, a strength adjustment unit 65, a charging and discharging unit 66, an action stopping unit 67, a charge amount detection unit 68, a regulation process unit 69, and a regulation process monitoring unit 70.

The power source activation unit 61 activates the power source virtually when the IC card comes into proximity to a reader-writer or the like and turns off the power source virtually when the IC card is moved away from the reader-writer or the like. Here, to activate the power source virtually is to cause the charging and discharging circuit 41 to function as the equivalent circuit illustrated in FIG. 3A. On the other hand, to turn off the power source virtually is to cause the charging and discharging circuit 41 to function as the equivalent circuit illustrated in FIG. 3B.

The strength determination unit 62 determines the number of recalculation as the strength of security measures that are currently set on the IC card.

The main processing unit 63 receives commands of processes that the IC chip 11 is to execute, and executes such processes.

The attack detection unit 64 detects an attack on the IC chip 11. That is, the attack detection unit 64 detects an attack on the IC chip 11 according to at least one detection technique of the first to third detection techniques of detecting an attack described above.

The strength adjustment unit 65 performs adjustment of the strength of the security measures, that is, adjustment of increasing or decreasing the number of recalculations.

The charging and discharging unit 66 is equivalent to the charging and discharging circuit 41 of FIG. 3, and starts the charging of the capacitor C when the power source is activated virtually by the power source activation unit 61 and starts the discharging of the capacitor C when the power source is turned off virtually by the power source activation unit 61.

The activation stopping unit 67 executes a control to stop the actions of the CPU 28, in particular, the actions of the main processing unit 63.

The charge amount detection unit 68 determines whether or not the first condition for reducing the number of recalculations has been satisfied by detecting the charge amount of the capacitor C of the charging and discharging unit (that is, the charging and discharging circuit 41 of FIG. 3) and comparing the charge amount with the predetermined threshold value L. That is, the charge amount detection unit 68 determines that the first condition has been satisfied and that the predetermined amount of time has passed when the charge amount detection unit 68 determines that the charge amount of the capacitor has become less than the predetermined threshold value L.

The regulation processing unit 69 executes a regulation process that is adopted as the second condition for reducing the number of recalculations. As such a regulation process, a process such as, for example, execution of a mutual authentication command or a recalculation number initialization command is able to be adopted.

The regulation process monitoring unit 70 monitors whether or not execution of the regulation process by the regulation process unit 69 has been successful.

Next, the processes that the CPU 28 executes in a case when the first condition, that is, when a predetermined amount of time has passed since a detection of an attack is adopted as the predetermined condition for reducing the number of recalculations (hereinafter referred to as a first security measure strength adjustment process) will be described.

[First Security Measure Strength Adjustment Process]

Figure 6:
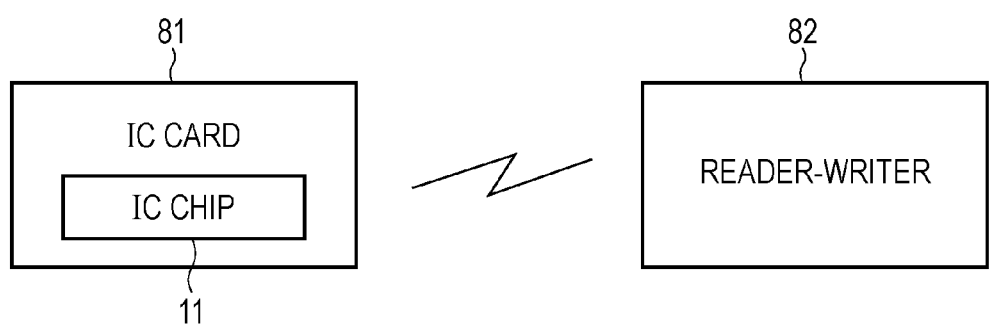
FIG. 6 is a diagram that illustrates a state in which a first security measure strength adjustment process is started.

FIG. 6 is a diagram that illustrates a state in which the first security measure strength adjustment process is started.

When a contactless type IC card 81 that includes the IC chip 11 is brought into proximity to a reader-writer 82, the IC card 81 receives the supply of electric power by electromagnetic induction. The first security strength adjustment process illustrated in FIG. 7 is then started.

Figure 7:
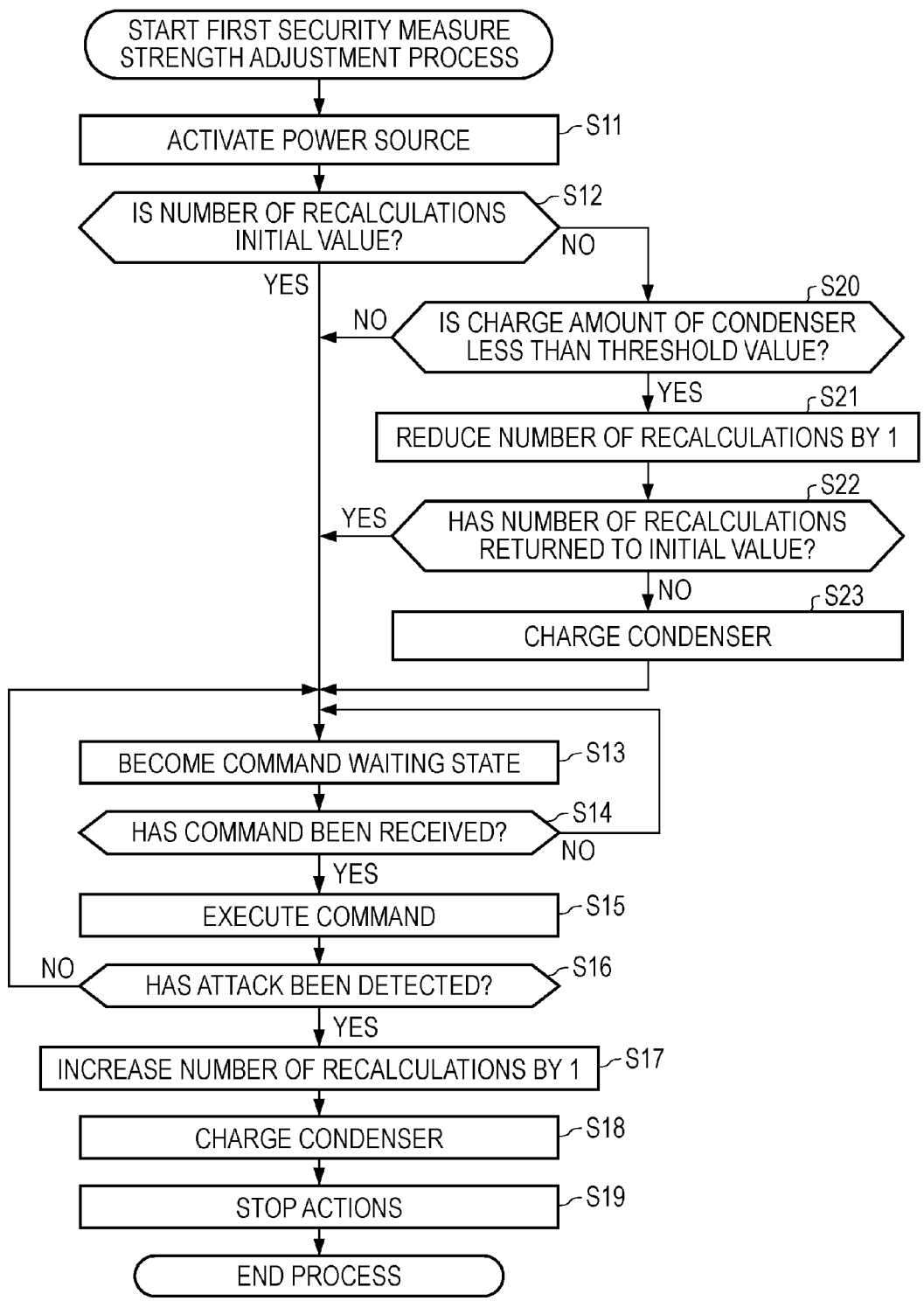
FIG. 7 is a flowchart that describes the flow of the first security measure strength adjustment process.

FIG. 7 is a flowchart that describes the flow of the first security measure strength adjustment process.

In step S11, the power source activation unit 61 activates the power source virtually using the electric power that is supplied from the reader-writer 82.

The strength determination unit 62 determines in step S12 whether the number of recalculations is the initial value. Here, the number of recalculations at security level 1 described above using FIG. 2, that is, one, is adopted as the initial value of the number of recalculations.

In a case when the number of recalculations is not one, step S12 is determined to be NO and the process proceeds to step S20. Here, processes of step S20 and beyond will be described later.

On the other hand, in a case when the number of recalculations is the initial value of one, step S12 is determined to be YES and the process proceeds to step S13. That is, in a case when an attack has hitherto not been detected or in a case when an attack has not been redetected since the number of recalculations is returned to the initial value in step S21 described later following the detection of an attack, step S12 is determined to be YES, and the process proceeds to step S13.

The main processing unit 63 becomes a command waiting state in step S13. That is, the main processing unit 63 waits for a command to be transmitted from the reader-writer 82.

The main processing unit 63 determines whether a command has been received in step S14.

In a case when a command has not been received, step S14 is determined to be NO, the process is returned to step S13, and the processes thereafter are repeated. That is, a loop process of the steps S13 and S14 is repeated until a command is received.

In a case when a command is then received, step S14 is determined to be YES and the process proceeds to step S15.

The main processing unit 63 executes the received command in step S15.

The attack detection unit 64 determines whether an attack has been detected in step S16. That is, the attack detection unit 64 attempts to detect attacks on the IC chip 11 by the first to third detection techniques described above.

In a case when an attack is not detected, step S16 is determined to be NO, the process is returned to step S13, and the processes thereafter are repeated. That is, a loop process of steps S13 to S16 is repeated until an attack is detected.

In a case when an attack is then detected, step S16 is determined to be YES and the process proceeds to step S17.

The strength adjustment unit 65 increases the number of recalculations by one in step S17. That is, the strength adjustment unit 65 raises the strength of the security measure by increasing the number of recalculations from the initial value of one to two.

The charging and discharging unit 66 charges the capacitor in step S18. That is, the charging and discharging unit 66 charges the capacitor in order to measure the passing of a predetermined amount of time since a detection of an attack.

The action stopping unit 67 stops the actions of the IC chip 11 in step S19.

In so doing, the first security measure strength adjustment process is ended.

On the other hand, in a case when the number of recalculations is not the initial value, step S12 is determined to be NO and the process proceeds to step S20. That is, since the first security measure strength adjustment process is started when the IC card is brought into proximity to a reader-writer or the like after an attack is detected and the number of recalculations is increased, the number of recalculations in such a case is determined to be not the initial value of one, that is, step S12 is determined to be NO, and the process proceeds to step S20.

The charge amount detection unit 68 determines whether the charge amount of the capacitor is less than the threshold value L in step S20. That is, the charge amount detection unit 68 determines whether a predetermined amount of time has passed since a detection of an attack.

In a case when the charge amount of the capacitor is not yet below the threshold value L, that is, in a case when the predetermined amount of time has not passed since the last detection of an attack, step S20 is determined to be NO and the process proceeds to step S13. That is, the main process is started while the number of recalculations is not reduced.

On the other hand, in a case when the charge amount of the capacitor is less than the threshold value L, that is, in a case when the predetermined amount of time has passed since the last detection of an attack, step S20 is determined to be YES and the process proceeds to step S21.

The strength adjustment unit 65 reduces the number of recalculations by one in step S21. For example, in a case when the number of recalculations at the point of step S12 was three, the strength adjustment unit 65 reduces the number of recalculations from three to two. Further, for example, in a case when the number of recalculations at the point of step S12 was two, the strength adjustment unit 65 reduces the number of recalculations from two to one.

The strength determination unit 62 determines whether the number of recalculations has returned to the initial value in step S22.

In a case when the number of recalculation has returned to the initial value of one, step S22 is determined to be YES and the process proceeds to step S13.

On the other hand, in a case when the number of recalculations has not returned to the initial value of one, step S22 is determined to be NO and the process proceeds to step S23. For example, in a case when the number of recalculations at the point of step S12 was three, since the number of recalculations becomes two due to the process of step S21, the strength determination unit 62 determines in step S22 that the number of recalculations has not returned to the initial value.

The charging and discharging unit 66 charges the capacitor in step S23. That is, the charging and discharging unit 66 charges the capacitor once again in order to reset the measurement of the passing of the predetermined amount of time.

The process then proceeds to step S13. Since the processes of steps S13 to S16 are repeated, description thereof will be omitted.

The strength adjustment unit 65 increases the number of recalculations in step S17. That is, the number of recalculations is increased even in a case when the capacitor is charged in the process of step S23 and an attack is detected while the passing of the predetermined amount of time is being measured.

The charging and discharging unit 66 charges the capacitor in step S18. That is, in a case when an attack is detected while the passing of the predetermined amount of time is being measured, the charging and discharging unit 66 charges the capacitor in order to measure the passing of the amount of time since the last detection of an attack.

The action stopping unit 67 stops the actions of the IC chip 11 in step S19.

In so doing, the first security measure strength adjustment process is ended.

Here, the process of step S18 of charging the capacitor may be executed during the execution of the command in step S15. In so doing, the supply of electric power is stopped by the attacker during the charging of the capacitor, and the number of recalculations being returned to the initial value without waiting for the passing of the predetermined amount of time is able to be avoided.

Next, the processes that the CPU 28 executes in a case when the second condition, that is, the condition that the execution of the regulation process has been successful is adopted as the predetermined condition for reducing the number of recalculations (hereinafter referred to as a second security measure strength adjustment process) will be described using FIG. 8.

[Second Security Measure Strength Adjustment Process]

Figure 8:
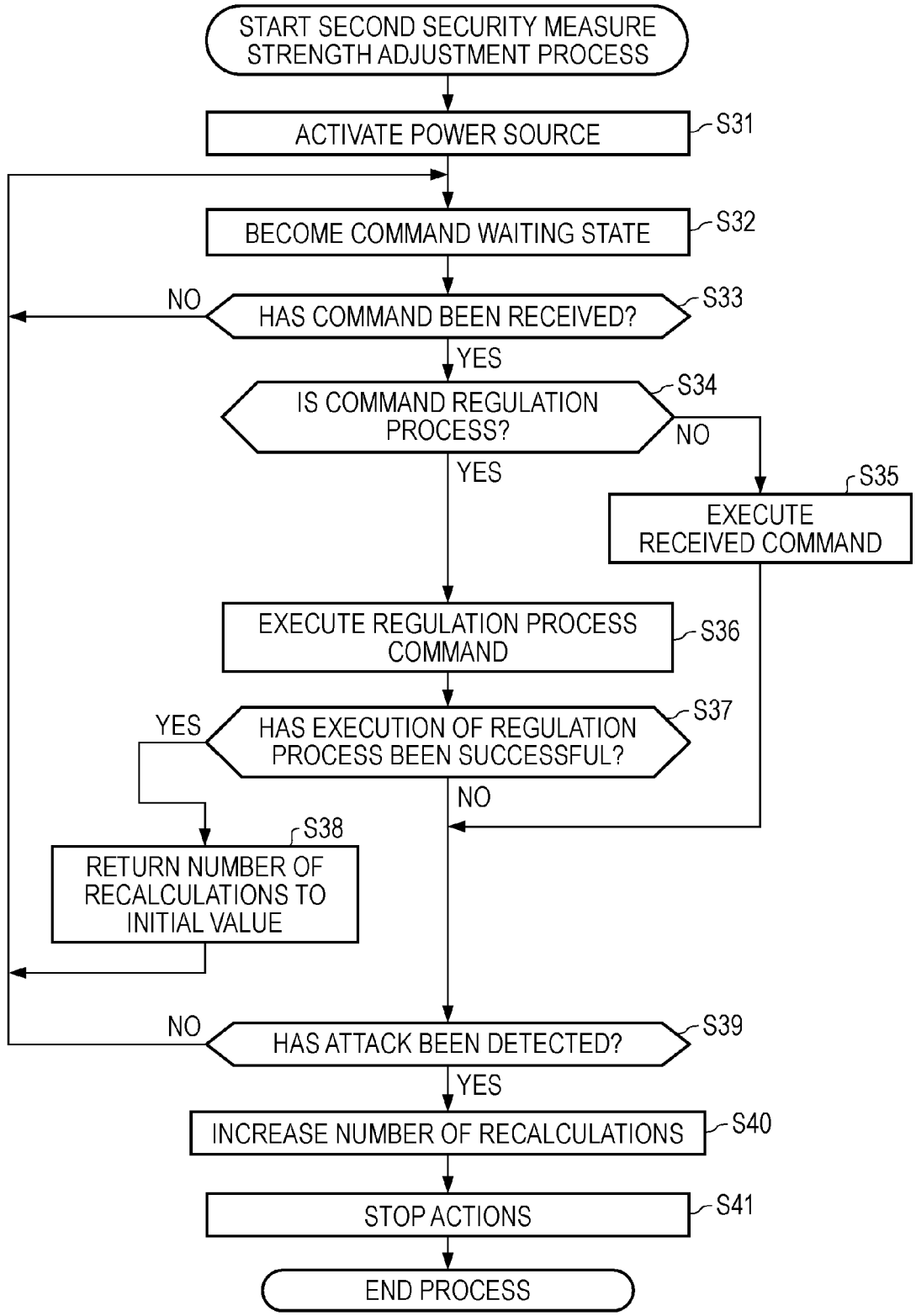
FIG. 8 is a flowchart that describes the flow of a second security measure strength adjustment process.

FIG. 8 is a diagram that illustrates a state in which the second security measure strength adjustment process is started.

When a contactless type IC card 81 that includes the IC chip 11 is brought into proximity to a reader-writer 82, the IC card 81 receives the supply of electric power from the reader-writer 82 by electromagnetic induction. The second security strength adjustment process illustrated in FIG. 8 is then started.

When the IC card 81 is brought into proximity to the reader-writer 82, the second security measure strength adjustment process is started.

In step S31, the power source activation unit 61 activates the power source virtually using the electric power that is supplied from the reader-writer 82.

The main processing unit 63 becomes a command waiting state in step S32. That is, the main processing unit 63 waits for a command to be transmitted from the reader-writer 82.

The main processing unit 63 determines whether a command has been received in step S33.

In a case when a command has not been received, step S33 is determined to be NO, the process is returned to step S32, and the processes thereafter are repeated. That is, a loop process of the steps S32 and S33 is repeated until a command is received.

In a case when a command is then received, step S33 is determined to be YES and the process proceeds to step S34.

The main processing unit 63 determines whether the received command is a regulation process command in step S34.

In a case when the received command is not a command for a regulation process, step S34 is determined to be NO and the process proceeds to step S35.

The main processing unit 63 executes the received command in step S35. The process then proceeds to step S39. Here, the processes of step S39 and thereafter will be described later.

On the other hand, in a case when the command received in step S34 is a command for a regulation process, YES is determined and the process proceeds to step S36.

The regulation process unit 69 executes the command for a regulation process in step S36.

The regulation process monitoring unit 70 determines in step S37 whether or not the execution of the regulation process has been successful.

In a case when the execution of the regulation process was successful, YES is determined in step S37 and the process proceeds to step S38.

The strength adjustment unit 65 returns the number of recalculations to the initial value of one in step S38. The process is then returned to step S32 and the processes thereafter are repeated. That is, a loop process of steps S32 to S38 is repeated until the execution of the regulation process is unsuccessful.

Later, in a case when an execution of the regulation process was unsuccessful, step S37 is determined to be NO and the process proceeds to step S39.

The attack detection unit 64 determines in step S39 whether an attack has been detected. That is, the attack detection unit 64 attempts the detection of an attack on the IC chip 11 by the first to third detection techniques describes above or the like.

In a case when an attack is not detected, step S39 is determined to be NO, the process is returned to step S32, and the processes thereafter are repeated. That is, a loop process of steps S32 to S39 is repeated until an attack is detected.

In a case when an attack is then detected, step S39 is determined to be YES and the process proceeds to step S40.

The strength adjustment unit 65 increases the number of recalculations by one in step S40. That is, the strength adjustment unit 65 raises the strength of the security measure by increasing the number of recalculations by one.

The action stopping unit 67 stops the actions of the IC chip 11 in step S41.

In so doing, the second security measure strength adjustment process is ended.

As described above, according to the first embodiment, since the number of recalculations is increased every time that an attack is detected, the security level increases, the difficulty of an attack increases, and the probability that an attacker is able to obtain confidential information decreases. Further, since the number of recalculations decreases in a case when a predetermined condition is satisfied, the processing speed is able to be maintained.

<2. Second Embodiment>

According to the first embodiment, recalculation of important processes was adopted as a security measure, and in a case when raising the strength of the security measure, the number of recalculations of the important processes was increased. However, a security measure is not limited only to the recalculation of important processes, and it is possible to adopt another security measure or to adopt a combination thereof. In so doing, the strength of the security measure is raised further compared to a case when the security measure is only the recalculation of important processes.

[Type and Strength of Security Measure]

FIG. 9 is a diagram that describes the relationship between the type and strength of the security measure.

As illustrated in FIG. 9, recalculation of important processes, insertion of a timing jitter, dummy calculation, the amount of time until the strength of the security measure is lowered, and the number of successful regulation processes are able to be adopted as types of security measures.

In recalculation, the same calculation as a predetermined calculation that the IC chip 11 performs is performed, and it is verified that the result of a comparison process of both calculation results match. It is possible to make matching the results of the comparison process difficult by increasing the number of recalculations. In a case when raising the strength of the security measure, by increasing the number of recalculation of important processes, it is possible to make an attack to obtain confidential information before it is noticed that the results of the comparison process match more difficult.

A timing jitter is a fluctuation in an event timing, and the processing time is able to be randomized by inserting a timing jitter. Therefore, in a case when raising the strength of the security measure, by increasing the insertion amount of the timing jitter, it is possible to make an attack targeting a critical point more difficult.

Dummy calculation is a calculation that is different from the predetermined calculation that the IC chip ordinarily performs, and by randomly inserting a dummy calculation, the timing of the calculation that is ordinarily performed becomes harder to estimate. Therefore, in a case when raising the strength of the security measure, by inserting a dummy calculation, it is possible to make an attack to obtain confidential information by measuring the time at which a calculation is executed more difficult.

The amount of time until the strength of the security measure is lowered is the predetermined amount of the "passing of a predetermined amount of time" adopted as the first condition in a case when incrementally lowering the strength of the security measure in the first embodiment. That is, the product of the electrostatic capacitance C and the resistance value of the resistance R is set so that the amount of time until the charge amount of the capacitor C of the charging and discharging circuit 41 becomes less than the predetermined threshold value L becomes the predetermined amount of time. By prolonging the amount of time until the strength of the security measure is lowered, it is possible to maintain a state in which the strength of the security measure is high. Therefore, in a case when raising the strength of the security measure, by prolonging the amount of time until the strength of the security measure is lowered, it is possible to prolong the amount of time during which an attack is more difficult.

The number of number of successful regulation processes is the number of times that the "execution of the regulation process is successful" that is adopted as the second condition in a case when incrementally lowering the strength of the security measure in the first embodiment. It is possible to make the condition for lowering the strength of the security measure strict by increasing the number of successful regulation processes. Therefore, in a case when raising the strength of the security measure, it is possible to maintain a state in which an attack is more difficult by increasing the number of successful regulation processes.

As described above, the strength of the plurality of security measures described are combined singularly or in plurality and incrementally adjusted every time than an attack is detected.

For example, as illustrated in FIG. 9, at security level 1 (that is, when it is normal in which an attack has not been detected), the number of recalculations is one, the insertion amount of a timing jitter is 10%, the insertion of a dummy calculation is none, the amount of time until the strength of the security measure is lowered is 10 minutes, and the number of successful regulation processes is one.

At security level 2 (that is, when the cumulative number of detected attacks is one), the number of recalculations is two, the insertion amount of a timing jitter is 20%, the insertion of a dummy calculation is none, the amount of time until the strength of the security measure is lowered is 30 minutes, and the number of successful regulation processes is two.

At security level 3 (that is, when the cumulative number of detected attacks is two), the number of recalculations is three, the insertion amount of a timing jitter is 30%, the insertion of a dummy calculation is present, the amount of time until the strength of the security measure is lowered is 60 minutes, and the number of successful regulation processes is three.

Next, the process in a case when the first condition (that is, the condition that a predetermined amount of time has passed since a detection of an attack) is adopted as the condition to lower the security level in a case when a plurality of security measures are combined in such a manner (hereinafter referred to as a third security measure strength adjustment process) will be described using FIG. 10.

Furthermore, the process in a case when the second condition (that is, the condition that the execution of a regulation process has been successful) is adopted as the condition to lower the security level in a case when a plurality of security measures are combined in such a manner (hereinafter referred to as a fourth security measure strength adjustment process) will be described using FIG. 11.

First, the third security measure strength adjustment process in a case when the first condition, that is, the condition that a predetermined amount of time has passed since a detection of an attack is adopted as the condition for lowering the security level will be described using FIG. 10.

[Third Security Measure Strength Adjustment Process]

Figure 10:
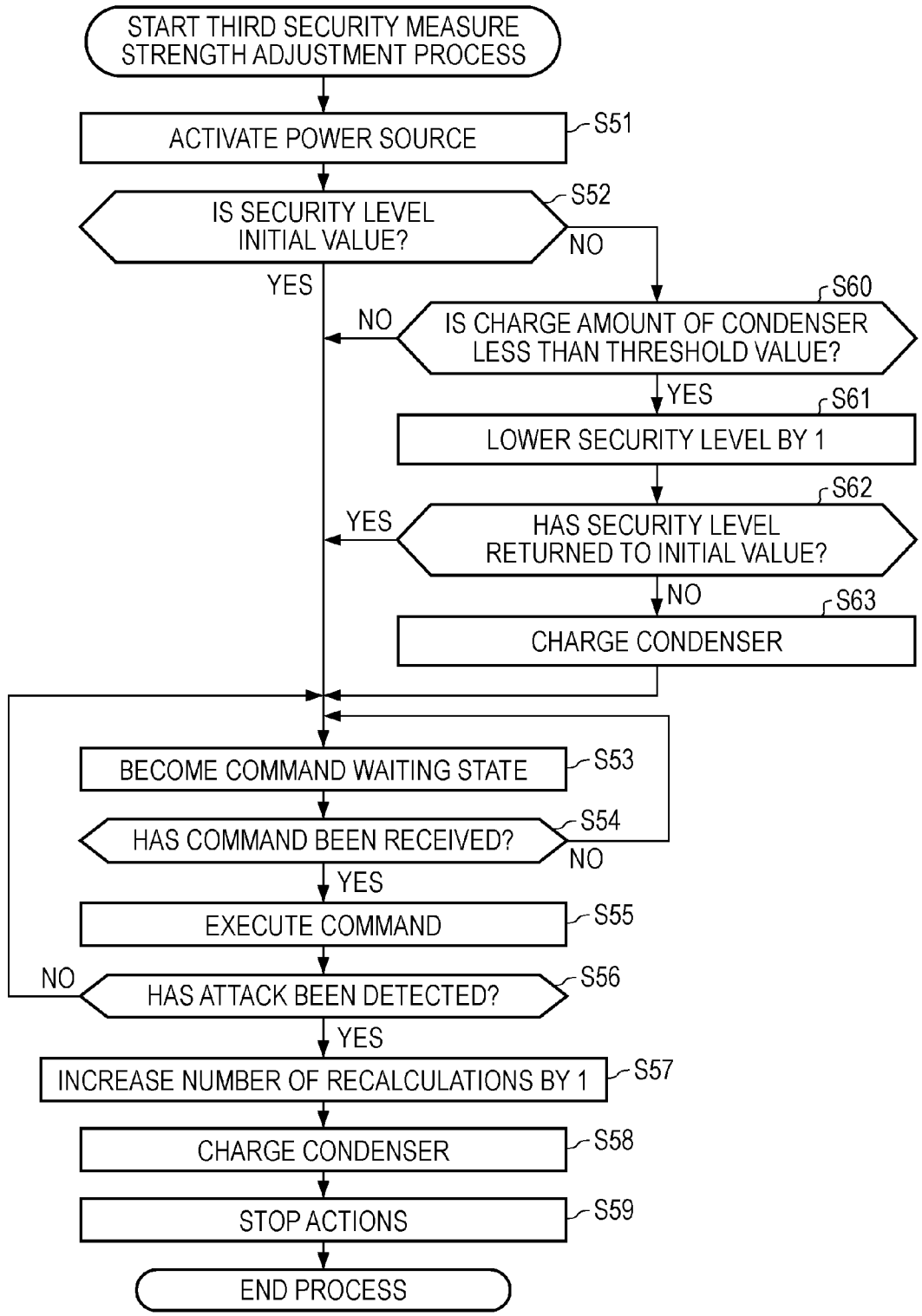
FIG. 10 is a flowchart that describes the flow of a third security measure strength adjustment process.

FIG. 10 is a flowchart that describes the flow of the third security measure strength adjustment process.

Each process of the third security measure strength adjustment process is fundamentally the same as each process of the first security measure strength adjustment process in FIG. 7. Therefore, description of the same processes will be omitted to avoid repetition, and only processes that are different will be described.

In step S51, the power source activation unit 61 activates the power source virtually by the electric power that is supplied from the reader-writer 82.

The strength determination unit 62 determines whether the security level is the initial value in step S52. Here, the initial value of the security level is 1.

In a case when the security level is not the initial level of 1, NO is determined in step S52 and the process proceeds to step S60. Here, the processes of step S60 and thereafter will be described later.

On the other hand, in a case when the security level is the initial value of 1, YES is determined in step S52 and the process proceeds to step S53.

The main processing unit 63 becomes a command waiting state in step S53. Since the processes of steps S54 to S56 thereafter are the same as the processes of steps S14 to S16 of FIG. 7, description thereof will be omitted to avoid repetition.

In a case when the attack detection unit 64 detects an attack in step S56, the strength adjustment unit 65 raises the security level by one in step S57. That is, the strength adjustment unit 65 raises the security level from 1 to 2, sets the number of recalculations to two, sets the insertion amount of a timing jitter to 20%, and sets the insertion of a dummy calculation to none.

Since the processes of step S58 and thereafter are the same as the processes of step S18 and thereafter of FIG. 7, description thereof will be omitted to avoid repetition.

On the other hand, in a case when the security level is not the initial value of 1 in step S52, NO is determined and the process proceeds to step S60. That is, if the IC card 81 is brought into proximity to the reader-writer 82 or the like after an attack is detected and the security level is raised, the third security measure strength adjustment process is started once again. In such a case, it is determined that the security level is not the initial value of 1, that is, NO is determined in step S52, and the process proceeds to step S60.

The charge amount detection unit 68 determines whether the charge amount of the capacitor is less than the threshold value L in step S61.

In a case when the charge amount of the capacitor is not below the threshold value L, NO is determined in step S60 and the process proceeds to step S53.

On the other hand, in a case when the charge amount of the capacitor is less than the threshold value L, YES is determined in step S60 and the process proceeds to step S61.

The strength adjustment unit 65 lowers the security level by one in step S61. For example, in a case when the security level was 3 at the point of step S52, the strength adjustment unit 65 lowers the security level from 3 to 2. Further, for example, in a case when the security level was 2 at the point of step S52, the strength adjustment unit 65 lowers the security level from 2 to 1.

The strength adjustment unit 62 determines in step S62 whether the security level was returned to the initial value.

In a case when the security level has returned to the initial value of 1, YES is determined in step S61 and the process proceeds to step S53.

On the other hand, in a case when the security level has not returned to the initial value of 1, NO is determined in step S61 and the process proceeds to step S62. For example, in a case when the security level was 3 at the point of step S52, since the security level becomes 2 due to the process of step S60, the strength determination unit 62 determines in step S62 that the security level has not returned to the initial value.

Description of the processes of step S63 and thereafter will be omitted to avoid repetition.

The third security measure strength adjustment process is executed as described above.

Next, the fourth security measure strength adjustment process in a case when the second condition, that is, the condition that the execution of a regulation process has been successful is adopted as the condition for lowering the security level will be described using FIG. 11.

[Fourth Security Measure Strength Adjustment Process]

Figure 11:
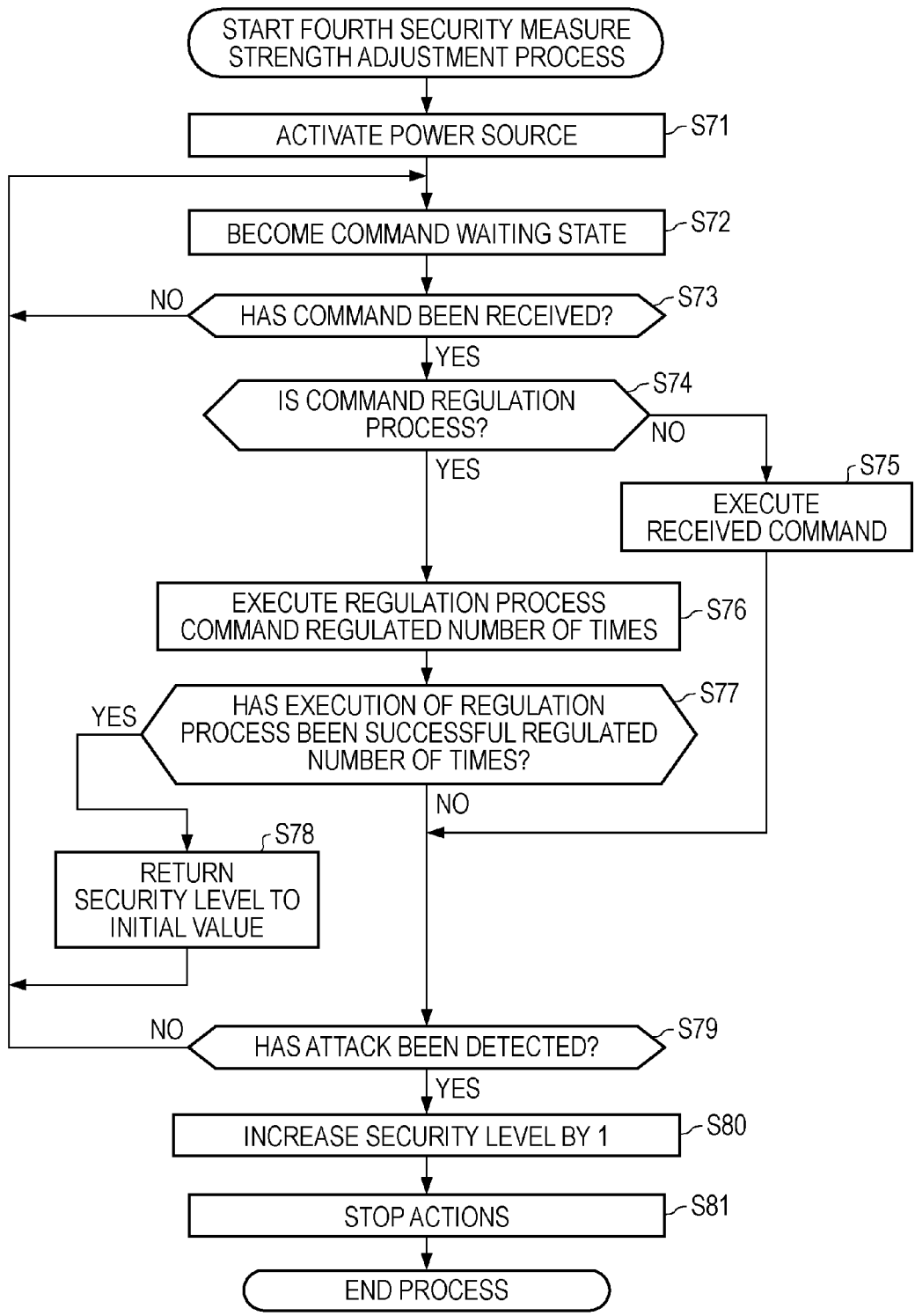
FIG. 11 is a flowchart that describes the flow of a fourth security measure strength adjustment process.

FIG. 11 is a flowchart that describes the flow of the fourth security measure strength adjustment process.

Each process of the fourth security measure strength adjustment process is fundamentally the same as each process of the second security measure strength adjustment process of FIG. 8. Therefore, description of the same process will be omitted to avoid repetition, and only processes that are different will be described.

Once the power source activation unit 61 activates the power source virtually by the electric power that is supplied from the reader-writer 82 in step S71, the main processing unit 63 becomes a command waiting state in step S72.

Since the processes of step S72 to S75 that follow are the same as the processes of step S32 to S35 of FIG. 8, description thereof will be omitted to avoid repetition.

In a case when the main processing unit 63 receives a command for a regulation process in step S74, the regulation process unit 69 executes the regulation process demand a default number of times in step S76. That is, the regulation process is executed twice in a case when the security level is 2 and three times in a case when the security level is 3.

The regulation process monitoring unit 70 determines in step S77 whether the execution of the regulation process has been successful a regulated number of times.

In a case when the execution of the regulation process has been successful a regulated number of times, YES is determined in step S77 and the process proceeds to step S78.

The strength adjustment unit 65 returns the security level to the initial value of 1 in step S78. The process is then returned to step S72 and the processes thereafter are repeated. That is, a loop process of steps S72 to S78 is repeated until the execution of the regulation process is not successful a regulated number of times.

In a case when the execution of the regulation process is not successful a regulated number of times, NO is then determined in step S77 and the process proceeds to step S79.

The attack detection unit 64 determines in step S79 whether an attack has been detected. That is, the attack detection unit 64 attempts the detection of an attack on the IC chip 11 by the first to third detection techniques described above.

In a case when an attack is not detected, NO is determined in step S79, the process is returned to step S72, and the processes thereafter are repeated. That is, a loop process of steps S72 to S79 is repeated until an attack is detected.

In a case when an attack is detected, YES is then determined in step S79 and the process proceeds to step S80.

The strength adjustment unit 65 raises the security level by one in step S80.

The action stopping unit 67 stops the actions of the IC chip 11 in step S81.

In so doing, the fourth security measure strength adjustment process is ended.

Here, the security measures are not limited to the examples described above, and neither combinations thereof nor the increase and decrease amounts of the security level are limited to the examples described above.

As described above, according to the second embodiment, since a plurality of security measures are able to be combined and adopted, the strength of security measures is increased further than when one security measure is adopted.

<3. Third Embodiment>

According to the first and second embodiments, the strength of the security measure was incrementally adjusted every time that an attack was detected or every time that a predetermined condition was satisfied. However, the adjustment of the strength of security measures may be not performed on all functions that the IC chip 11 executes but only on functions by which an attack is detected.

For example, in a case when there is a function A that performs an encryption process and a function B that performs an authentication process, security level parameters for determining the number of recalculations of important processes are respectively retained by the functions. Furthermore, only the values of the security level parameters that a function by which an attack is detected are increased by one. For example, in a case when an attack is detected only on the function A, the values of only the security level parameters that the function A retains (Security_Level_A) are increased by one. Further, for example, in a case when an attack is detected only on the function B, the values of only the security level parameters that the function B retains (Security_Level_B) are increased by one. In a case when an attack is detected on both functions A and B, the values of the security level parameters that both functions retain are respectively increased by one.

In so doing, functions for which the number of recalculations increases are limited. Therefore, it is possible to suppress a decrease in the processing speed of the IC chip 11 and to maintain usability. Description will be given below with the important process for which the number of recalculations is increased as the encryption calculation.

In such a manner, in a case when performing adjustment of the strength of the security measure only for a function by which an attack is detected, the processes that the CPU 28 executes (hereinafter referred to as a fifth security measure strength adjustment process) will be described using FIG. 12.

[Fifth Security Measure Strength Adjustment Process]

Figure 12:
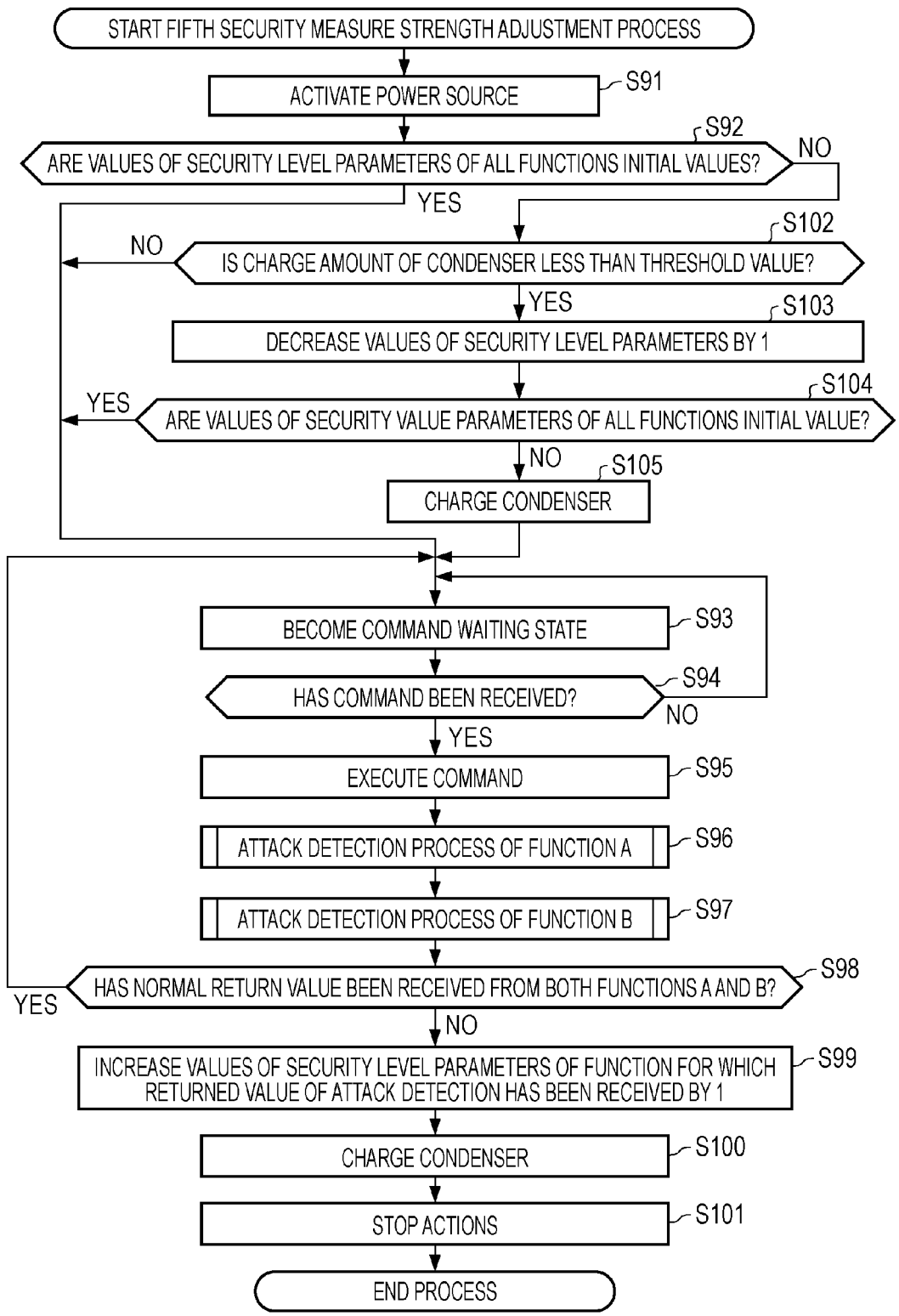
FIG. 12 is a flowchart that describes the flow of a fifth security measure strength adjustment process.

FIG. 12 is a flowchart that describes the flow of the fifth security measure strength adjustment process.

Here, all of the functions that the IC chip 11 executes are the functions A and B.

When the contactless type IC card 81 that includes the IC chip 11 is brought into proximity to the reader-writer 82, the IC card 81 receives the supply of electric power from the reader-writer 82 by electromagnetic induction. The fifth security strength adjustment process illustrated in FIG. 12 is then started.

In step S91, the power source activation unit 61 activates the power source virtually by the electric power that is supplied from the reader-writer 82.

The strength determination unit 62 determines in step S92 whether the values of the security level parameters of all functions are initial values. That is, the strength determination unit 62 determines whether the values of Security_Level_A and Security_Level_B that are the security parameters of the functions A and B are both the initial values. Here, the initial values of the security level parameters are one.

In a case when one or both of the values of Security_Level_A and Security_Level_B are not the initial value of one, NO is determined in step S92 and the process proceeds to step S102. Here, the processes of step S102 and thereafter will be described later.

On the other hand, in a case when both of the values of Security_Level_A and Security_Level_B are the initial value of one, YES is determined in step S92 and the process proceeds to step S93. That is, in a case when an attack has hitherto not been detected on either of the functions A and B, or in a case when an attack has not been redetected in step S103 described later since the security level parameters of a function by which an attack was detected has since been returned to the initial value, YES is detected in step S92 and the process proceeds to step S93.

The main processing unit 63 becomes a command waiting state in step S93. That is, the main processing unit 63 waits for a command for executing the functions A and B to be transmitted from the reader-writer 82.

The main processing unit 63 determines in step S94 whether the command has been received.

In a case when the command has not been received, NO is determined in step S94, the process is returned to step S93, and the processes thereafter are repeated. That is, a loop process of the steps S93 and S94 is repeated until the command is received.

In a case when the command is later received, Yes is determined in step S94 and the process proceeds to step S95.

The main processing unit 63 executes the received command in step S95. That is, the main processing unit 63 executes the processes of the functions A and B according to the received command.

The attack detection unit 64 executes an attack detection process on the function A in step S96. Here, the attack detection process on the function A will be described later using FIG. 13.

The attack detection unit 64 executes an attack detection process on the function B in step S97. Here, the attack detection process on the function B will be described later using FIG. 14.

Here, the processes of steps S96 and S97 are performed in parallel.

Figure 13:
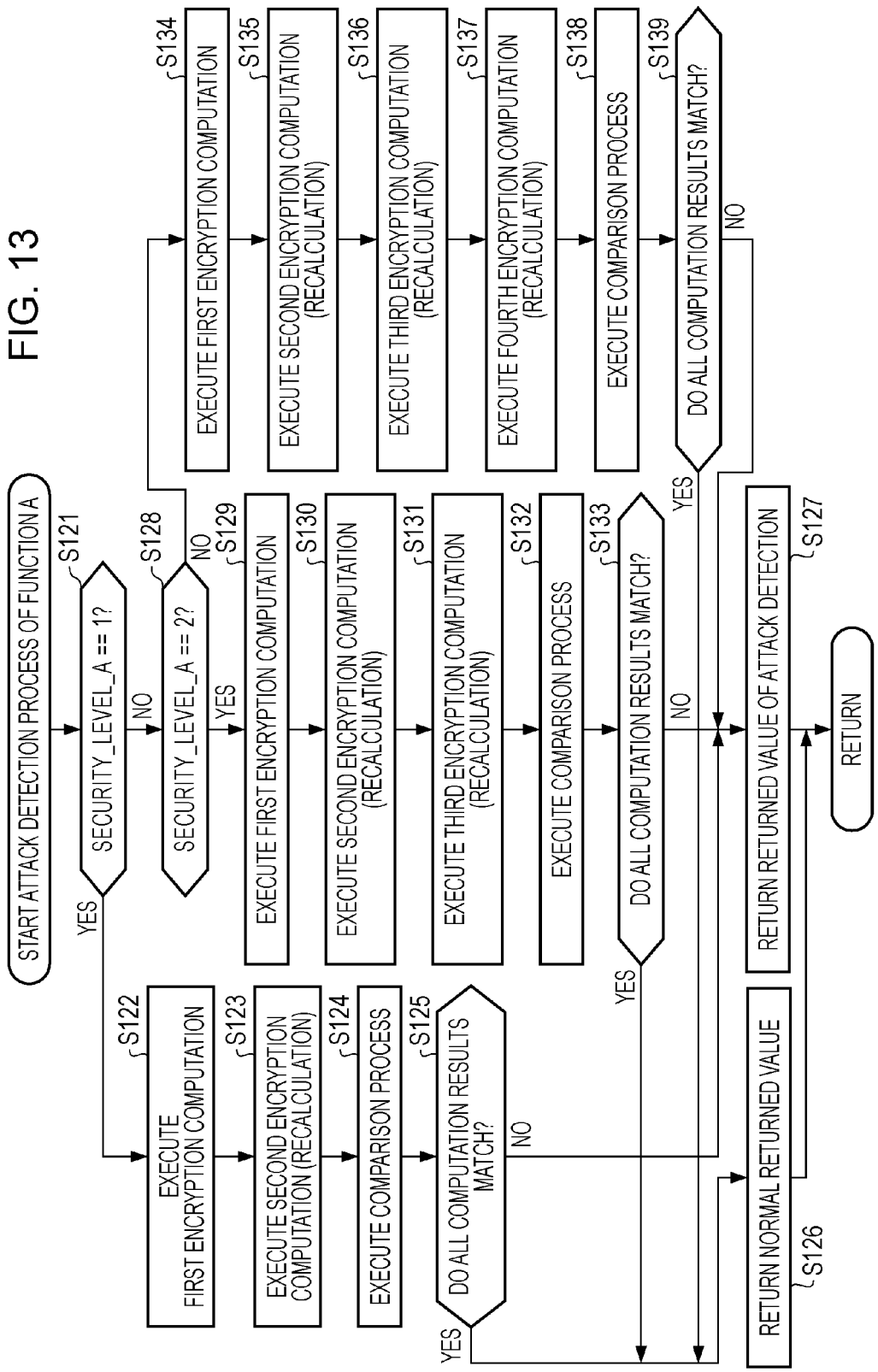
FIG. 13 is a flowchart that describes the flow of an attack detection process of a function A.

FIG. 13 is a flowchart that describes the flow of the attack detection process on the function A.

The attack detection unit 64 determines in step S121 whether the value of Security_Level_A is one.

In a case when the value of Security_Level_A is not one, NO is determined in step S121 and the process proceeds to step S128. Here, the processes of step S128 and thereafter will be described later.

In a case when the value of Security_Level_A is one, YES is determined in step S121 and the process proceeds to step S122.

The attack detection unit 64 executes the first encryption calculation in step S122.

The attack detection unit 64 executes the second encryption calculation in step S123. That is, the regulation process unit 69 executes the second encryption calculation that is the same as the first encryption calculation after executing the first encryption calculation as a recalculation thereof.

The attack detection unit 64 executes a comparison process in step S124. That is, the regulation process monitoring unit 70 executes a comparison process of comparing the two calculation results of the first and second encryption calculations.

The attack detection unit 64 determines in step S125 whether all of the calculation results match.

In a case when all of the calculation result match, that is, in a case when the two calculation results of the first and second encryption calculation match, YES is determined in step S125 and the process proceeds to step S126. That is, it is determined that there has not been an attack on the function A.

The attack detection unit 64 returns a normal returned value to the fifth security measure adjustment process in step S126.

In so doing, the attack detection process on the function A is ended. That is, the process of step S96 of FIG. 12 is ended and the process proceeds to step S97.

On the other hand, in a case when not all of the calculation results match, that is, in a case when the two calculation results of the first and second encryption calculation do not match and it is determined that there has been an attack, NO is determined in step S125 and the process proceeds to step S127.

The attack detection unit 64 returns a returned value of a detection of an attack to the fifth security measure strength adjustment process in step S127.

In so doing, the attack detection process of the function A is ended. That is, the process of step S96 of FIG. 12 is ended and the process proceeds to step S97.

On the other hand, in a case when the value of Security_Level_A is not one, NO is determined in step S121 and the process proceeds to step S128.

The attack detection unit 64 determines in step S128 whether the value of Security_Level_A is two.

In a case when the value of Security_Level_A is not two, NO is determined in step S128 and the process proceeds to step S134. The processes of step S134 and thereafter will be described later.

In a case when the value of Security_Level_A is two, YES is determined in step S128 and the process proceeds to step S129.

The attack detection unit 64 executes the first encryption calculation in step S129.

The attack detection unit 64 executes the second encryption calculation in step S130. That is, the regulation process unit 69 executes the second encryption calculation that is the same as the first encryption calculation after executing the first encryption calculation as a recalculation thereof.

The attack detection unit 64 executes the third encryption calculation in step S131. That is, the regulation process unit 69 performs recalculation by executing the third encryption calculation that is the same as the first encryption calculation.

The attack detection unit 64 executes a comparison process in step S132. That is, the regulation process monitoring unit 70 executes a comparison process of comparing the three calculation results of the first to third encryption calculations.

The attack detection unit 64 determines in step S133 whether all of the calculation results match.

In a case when all of the calculation results match, that is, in a case when the three calculation results of the first to third encryption calculations match, YES is determined in step S133 and the process proceeds to step S126. That is, it is determined that there has not been an attack on the function A.

The attack detection unit 64 returns a normal returned value to the fifth security measure strength adjustment process in step S126.

In so doing, the attack detection process on the function A is ended. That is, the process of step S96 of FIG. 12 is ended and the process proceeds to step S97.

On the other hand, in a case when not all of the calculation results do not match, that is, in a case when not all of the three calculation results of the first to third encryption calculations do not match and it is determined that there has been an attack, NO is determined in step S133 and the process proceeds to step S127.

The attack detection unit 64 returns a returned value of a detection of an attack to the fifth security measure strength adjustment process in step S127.

In so doing, the attack detection process of the function A is ended. That is, the process of step S96 of FIG. 12 is ended and the process proceeds to step S97.

On the other hand, in a case when the value of Security_Level_A in step S128 is not two, that is, in a case when the value of Security_Level_A is equal to or greater than three, NO is determined in step S128 and the process proceeds to step S134.

The attack detection unit 64 executes the first encryption calculation in step S134.

The attack detection unit 64 executes the second encryption calculation in step S135. That is, the regulation process unit 69 executes the second encryption calculation that is the same as the first encryption calculation after executing the first encryption calculation as a recalculation thereof.

The attack detection unit 64 executes the third encryption calculation in step S136. That is, the regulation process unit 69 performs recalculation once again by executing the third encryption calculation that is the same as the first encryption calculation.

The attack detection unit 64 executes the fourth encryption calculation in step S137. That is, the regulation process unit 69 performs recalculation once again by executing the fourth encryption calculation that is the same as the first encryption calculation.

The attack detection unit 64 executes a comparison result in step S138. That is, the regulation process monitoring unit 70 executes a comparison process of comparing the four calculation results of the first to fourth encryption calculations.

The attack detection unit 64 determines in step S139 whether all of the calculation results match.

In a case when all of the calculation results match, that is, in a case when all four calculation results of the first to fourth encryption calculations match, YES is determined in step S139 and the process proceeds to step S126. That is, it is determined that there has not been an attack on the function A.

The attack detection unit 64 returns a normal returned value to the fifth security measure strength adjustment process in step S126.

In so doing, the attack detection process on the function A is ended. That is, the process of S96 of FIG. 12 is ended and the process proceeds to step S97.

On the other hand, in a case when not all of the calculation results match, that is, in a case when not all four calculation results of the first to fourth encryption calculations match and it is determined that there has been an attack, NO is determined in step S139, and the process proceeds to step S127.

The attack detection unit 64 returns a returned value of a detection of an attack to the fifth security measure strength adjustment process in step S127.

In so doing, the attack detection process of the function A is ended. That is, the process of step S96 of FIG. 12 is ended and the process proceeds to step S97.

The attack detection unit 64 executes an attack detection process on the function B in step S97.

Figure 14:
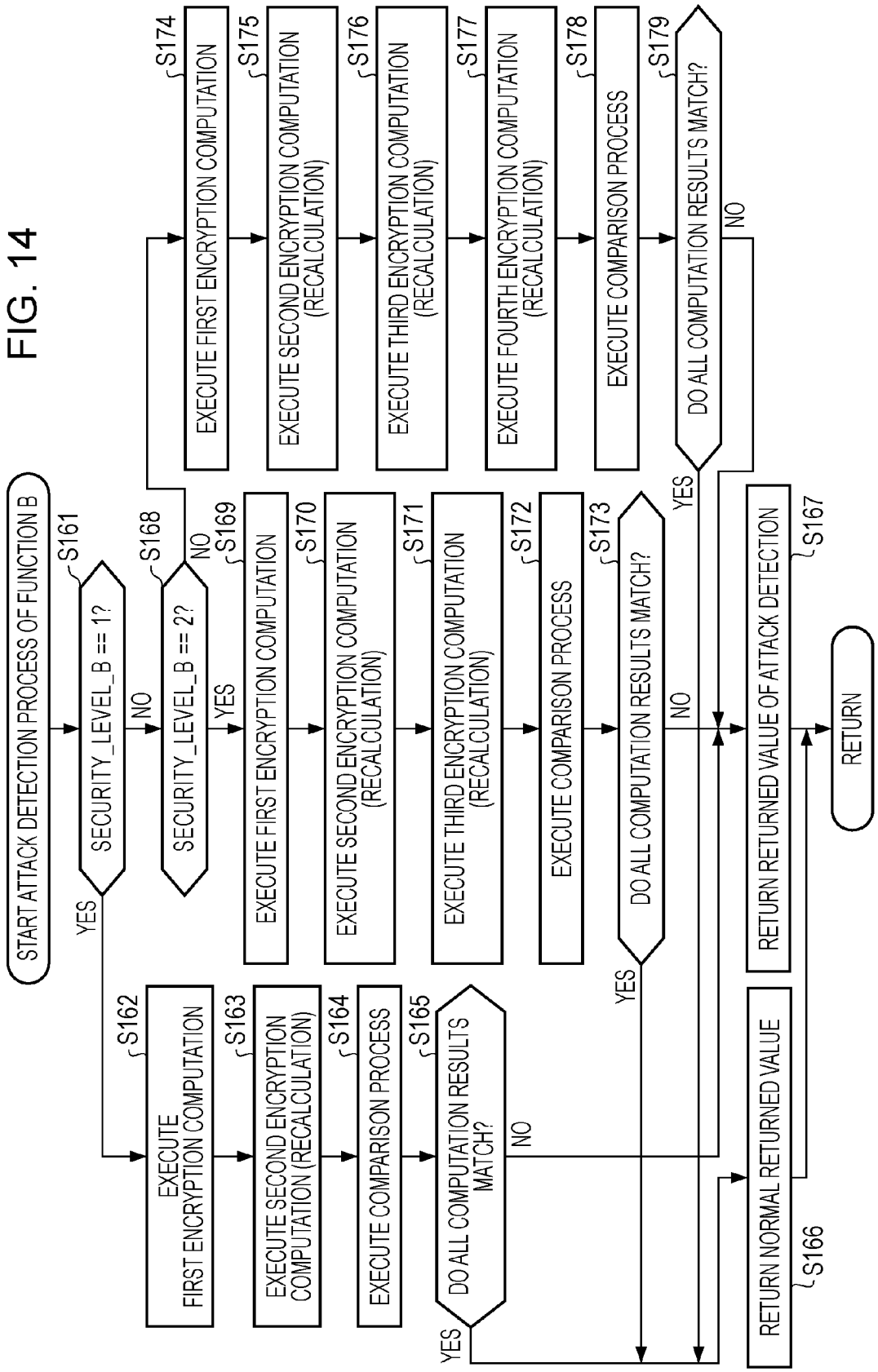
FIG. 14 is a flowchart that describes the flow of an attack detection process of a function B.

FIG. 14 is a flowchart that describes the flow of the attack detection process on the function B.

Each process of the attack detection process on the function B is fundamentally the same process as each process of the attack detection process on the function A in FIG. 13. According to the attack detection process on the function A of FIG. 13, the process was executed according to the value of the security level parameters that the function A retained (Security_Level_A). On the other hand, according to the attack detection process on the function B of FIG. 14, the process is executed according to the value of the security level parameters that the function B retains (Security_Level_B). Therefore, description of the attack detection process on the function B will be omitted to avoid repetition.

Once the detection of an attack on the function B, that is, the process of step S97 of FIG. 12, is ended, the process proceeds to step S98.

The attack detection unit 64 determines in step S98 whether normal returned values have been received from both the functions A and B.

In a case when normal returned values are received from both the functions A and B, that is, in a case when it is determined that there has not been an attack on either of the functions A and B, YES is determined in step S98, the process is returned to step S93, and the processes thereafter are repeated. That is, a loop process of steps S93 and S98 is repeated until normal returned values are not received from either of the functions A and B.

Thereafter, in a case when normal returned values are no longer received from both functions A and B, that is, in a case when it is determined that there has been an attack on one or both of the functions A and B, NO is determined in step S98 and the process proceeds to step S99.

In step S99, the strength adjustment unit 65 increases the value of the security parameters of the function that has received the returned value of a detection of an attack by one. That is, the strength adjustment unit 65 increases the values of the security parameters of the function that has received the returned value of a detection of an attack out of the functions A and B by one.

The charging and discharging unit 66 charges the capacitor in step S100. That is, the charging and discharging unit 66 charges the condense in order to measure the passing of a predetermined amount of time since the detection of an attack.

The action stopping unit 67 stops the actions of the IC chip 11 in step S101.

In so doing, the fifth security measure strength adjustment process is ended.

Here, in the description of the fifth security measure strength adjustment process, a case when the first condition is adopted as the predetermined condition for reducing the number of recalculations was described. However, the predetermined condition for reducing the number of recalculations is not limited to the example described above, and for example, the second condition may be adopted.

As described above, according to the third embodiment, since the functions for which the strength of the security measure is adjusted are limited, it is possible to suppress the processing speed of the IC chip 122 decreasing and to suppress the loss of usability.

<4. Fourth Embodiment

According to the third embodiment, only the strength of the security measure for functions by which an attack was detected was adjusted. However, adjustment of the strength of the security measure may be performed on all of the functions that constituent elements that configure the IC chip 11 that is executing the function by which an attack has been detected execute. That is, the strength of the security measure is adjusted only for the constituent elements that configure the IC chip 11 that is executing the function by which an attack has been detected. The constituent elements that configure the IC chip 11 are each of the constituent elements of the sensor 21 to the internal bus 29 illustrated by blocks in FIG. 1.

In such a case, the IC chip 11 possesses a mapping table that represents by which constituent elements all of the functions are executed. Furthermore, in a case when an attack is detected on a predetermined function, the mapping table is referenced, and the constituent element of the IC chip 11 which is executing the predetermined function by which the attack has been detected is specified. Furthermore, adjustment of the strength of the security measure is executed on all of the functions that the constituent element is executing. Here, the technique of the adjustment of the strength of the security measure is not particularly limited, and for example, the techniques used in the first to third embodiments are able to be adopted.

In so doing, according to the fourth embodiment, since the locations where the strength of the security measure is adjusted are limited, a decrease in the processing speed of the IC chip 11 is suppressed and usability is maintained.

[Application to Program of Embodiments of Technology]

The series of processes described above may be executed by hardware or may be executed by software.

Figure 15:
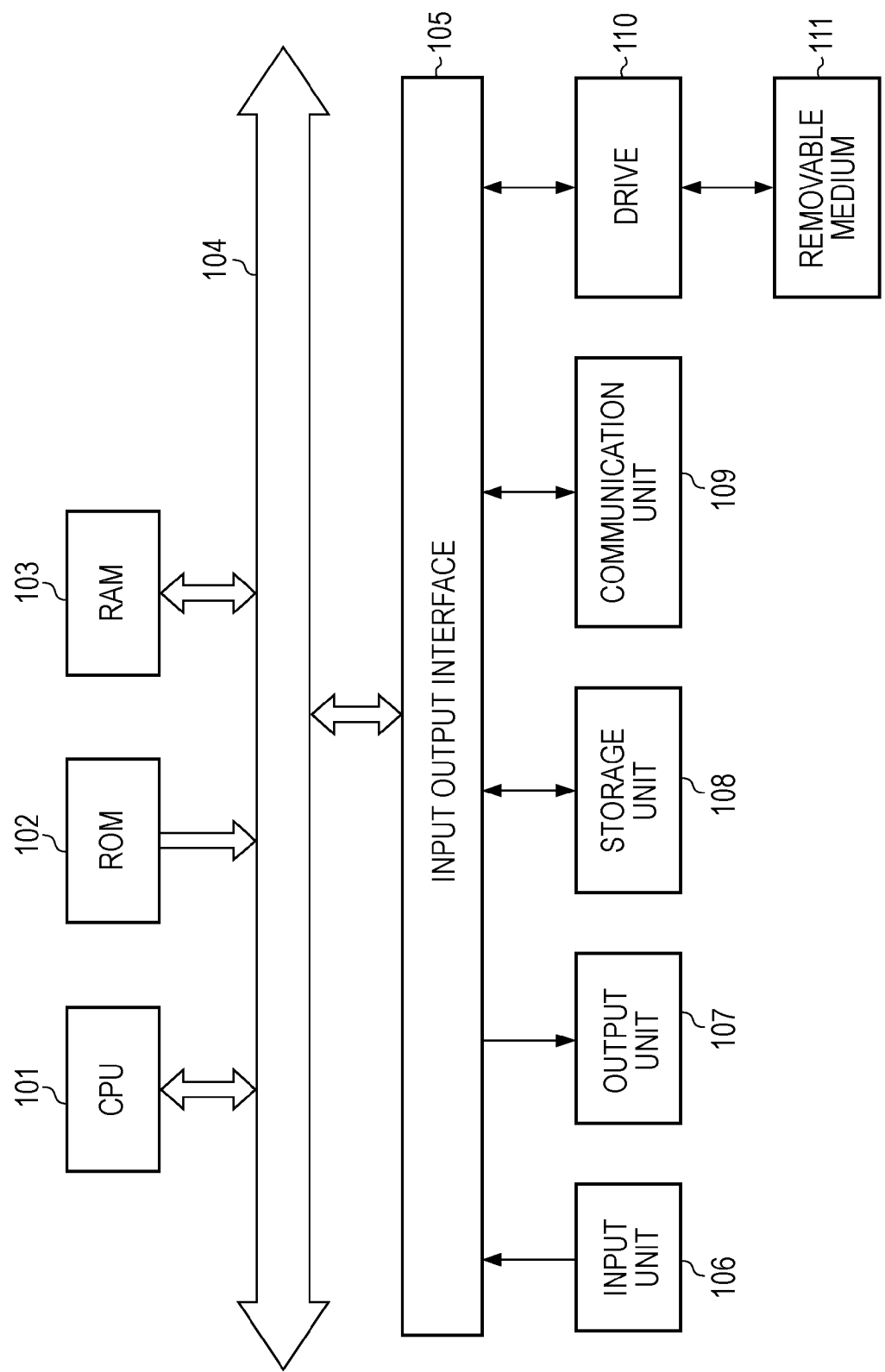
FIG. 15 is a block diagram that illustrates a hardware configuration example of an information processing apparatus to which the embodiments of the present technology are applied.

In such a case, the personal computer illustrated in FIG. 15, for example, may be adopted as at least a portion of the information processing apparatus described above.

In FIG. 15, a CPU 101 executes various processes according to a program that is recorded in a ROM 102. Alternatively, the various processes are executed according to a program that is loaded on a RAM 103 from a storage unit 108. Data that is used for the CPU 101 to execute the various processes and the like are also stored in the RAM 103 as appropriate.

The CPU 101, the ROM 102, and the RAM 103 are connected to one another via a bus 104. An input output interface 105 is also connected to the bus 104.

An input unit 106 composed of a keyboard, a mouse, and the like, and an output unit 107 composed of a display or the like are connected to the input output interface 105. Further, the storage unit 108 configured by a hard disk or the like, and a communication unit 109 configured by a modem, a terminal adapter, or the like are connected to the input output interface 105. The communication unit 109 controls the communication that is performed between other apparatuses (not shown) via networks including the Internet.

A drive 110 is also connected to the input output interface 105 as necessary, and a removable medium 111 composed of a magnetic disk, an optical disc, a magneto-optical disc, a semi-conductor memory, or the like is equipped as appropriate. Furthermore, a computer program that is read therefrom is installed on the storage unit 108 as necessary.

In a case when the series of processes is to be executed by software, a program that configures the software is installed on a computer to which dedicated hardware is built in or a general-purpose computer, for example, that is able to execute various functions by installing various programs from a network or a recording medium.

As illustrated in FIG. 15, recording media that include such a program are configured not only by magnetic disks (including floppy disks), optical discs (including CD-ROMs (Compact Disc-Read Only Memory) and DVDs (Digital Versatile Disc)), or magneto-optical discs (including MDs (Mini-Disc)), or a removable medium (package medium) 211 composed of a semi-conductor memory or the like on which programs are recorded which are distributed in order to provide programs to the users, but may also be configured by the ROM 102, a hard disk included in the storage unit 108, and the like on which programs that are provided to the user in a state of being built into the apparatuses themselves in advance are recorded.

Here, in the specification, the description of a program that is to be recorded on a recording medium includes not only processes that are performed in time series along the order thereof but also includes processes that are executed in parallel or individually even if such processes are not necessarily processed in time series.

The embodiments of the present technology are not limited to those described above, and various modifications are possible without departing from the gist of the present technology.

Here, the embodiments of the present technology may adopt the following configuration.

(1) An information processing apparatus including:
an attack detection unit that detects an attack; and
a strength adjustment unit that incrementally raises the strength of a security measure every time that an attack is detected by the attack detection unit.

(2) The information processing apparatus according to (1), wherein the strength adjustment unit incrementally lowers the strength of the security measure every time that a predetermined condition is satisfied.

(3) The information processing apparatus according to (1) or (2),
wherein the strength adjustment unit raises the strength of the security measure using at least one of an increase in the number of recalculations of important processes, an increase in the insertion amount of a timing jitter, an insertion of dummy calculation, an increase in the amount of time taken until returning to a normal mode, and an increase in the number of successful regulating processes.

(4) The information processing apparatus according to (1), (2), or (3),
wherein the predetermined condition is a condition that a predetermined amount of time has passed since an attack was detected by the attack detection unit.

(5) The information processing apparatus according to any one of (1) to (4),
wherein the predetermined condition is a condition that an execution of a regulation process has been successful.

(6) The information processing apparatus according to any one of (1) to (5), further including:
a charging and discharging unit that charges a capacitor after the detection of an attack by the attack detection unit; and
a charge amount detection unit that compares a charge amount of the capacitor that is being discharged by the charging and discharging unit and a predetermined threshold value,
wherein the predetermined amount of time is a discharging time of the capacitor until the charge amount reaches the predetermined threshold value.

(7) The information processing apparatus according to any one of (1) to (6),
wherein the strength adjustment unit makes the target for raising the strength of the security measure a function by which an attack has been detected by the attack detection unit.

(8) The information processing apparatus according to (1) to (7),
wherein the strength adjustment unit makes the target for raising the strength of the security measure all functions that constituent elements of the information processing apparatus execute in which the function by which an attack has been detected by the attack detection unit is being executed.

The embodiments of the present technology are able to be applied to contactless IC cards.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors operable to:
detect an attack on the information processing apparatus; and
incrementally raise a strength of a plurality of security measures simultaneously each time an attack is detected.

2. The information processing apparatus according to claim 1, wherein the one or more processors are further operable to incrementally lower the strength of the plurality of security measures each time a predetermined condition is satisfied, wherein the predetermined condition is a condition that a predetermined amount of time has passed since the detection of the attack.

3. The information processing apparatus according to claim 1, wherein the one or more processors are further operable to raise the strength of the plurality of security measures using at least one of an increase in a number of recalculations of important processes, an increase in an insertion amount of a timing jitter, an insertion of dummy calculation, an increase in an amount of time taken until returning to a normal mode, and an increase in a number of successful regulating processes.

4. The information processing apparatus according to claim 1, wherein the one or more processors are further operable to incrementally lower the strength of the plurality of security measures every time a predetermined condition is satisfied, wherein the predetermined condition is a condition that execution of a regulation process has been successful.

5. The information processing apparatus according to claim 1, wherein the one or more processors are operable to:
charge a capacitor after the detection of an attack; and
compare a charge amount of the capacitor being discharged and a predetermined threshold value, wherein the predetermined amount of time is a discharging time of the capacitor until the charge amount reaches the predetermined threshold value.

6. The information processing apparatus according to claim 1, wherein the one or more processors are operable to make a target for raising a strength of the plurality of security measures a function by which an attack has been detected.

7. The information processing apparatus according to claim 1, wherein the one or more processors are further operable to make a target for raising the strength of the plurality of security measures all functions that constituent elements of the information processing apparatus being executed in which a function by which an attack has been detected is being executed.

8. The information processing apparatus according to claim 1, wherein the strength of the plurality of security measures is incrementally raised and subsequently lowered when a predefined condition is satisfied to thereby maintain a predefined processing speed.

9. The information processing apparatus according to claim 1, wherein the one or more processors are further operable to execute a control to stop one or more actions of the one or more processors after the attack is detected.

10. The information processing apparatus according to claim 1, wherein the attack on the information processing apparatus comprises one or more of: a computer virus attack, a fault-based attack and a hardware-based attack.

11. An information processing method comprising:
in an information processing apparatus comprising one or more processors:
detecting an attack based on at least a change in performance of the information processing apparatus; and
adjusting a strength of a security measure by incrementally raising the strength of the security measure each time an attack is detected.

12. The information processing method according to claim 11, further comprising adjusting the strength of the security measure by incrementally lowering the strength of the security measure each time a predetermined condition is satisfied, wherein the predetermined condition is a condition that a predetermined amount of time has passed since detection of the attack.

13. The information processing method according to claim 11, wherein the predetermined condition is a condition that execution of a regulation process has been successful.

14. The information processing method according to claim 11, wherein the strength of the security measure is raised using one or more of an increase in a number of recalculations of important processes, an increase in an insertion amount of a timing jitter, an insertion of dummy calculation, an increase in an amount of time taken until returning to a normal mode, or an increase in a number of successful regulating processes.

15. The information processing method according to claim 11, further comprising:
charging a capacitor after the detection of the attack;
comparing a charge amount of the capacitor being discharged and a predetermined threshold value, wherein the predetermined amount of time is a discharging time of the capacitor until the charge amount reaches the predetermined threshold value.

16. The information processing method according to claim 11, further comprising making a target for raising a strength of the security measure a function by which the attack has been detected.

17. A non-transitory computer-readable storage medium having stored thereon, a computer program having at least one code section, the at least one code section being executable by one or more processors for causing a computer to perform the steps comprising:
detecting an attack on an information processing apparatus based on at least a change in performance of the information processing apparatus; and
adjusting a strength of a security measure by incrementally raising the strength of the security measure each time an attack is detected.

* * * * *